United States Patent
Mireshghallah et al.

(10) Patent No.: US 11,487,884 B2
(45) Date of Patent: Nov. 1, 2022

(54) METHODS OF PROVIDING DATA PRIVACY FOR NEURAL NETWORK BASED INFERENCE

(71) Applicant: The Regents of the University of California, Oakland, CA (US)

(72) Inventors: Fatemehsadat Mireshghallah, La Jolla, CA (US); Hadi Esmaeilzadeh, La Jolla, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 17/656,409

(22) Filed: Mar. 24, 2022

(65) Prior Publication Data

US 2022/0215104 A1 Jul. 7, 2022

Related U.S. Application Data

(63) Continuation of application No. 17/458,165, filed on Aug. 26, 2021, now Pat. No. 11,288,379, which is a continuation of application No. PCT/US2021/021227, filed on Mar. 5, 2021.

(60) Provisional application No. 62/986,552, filed on Mar. 6, 2020.

(51) Int. Cl.
G06F 21/60 (2013.01)
G06K 9/62 (2022.01)
G06N 3/08 (2006.01)

(52) U.S. Cl.
CPC .......... *G06F 21/60* (2013.01); *G06K 9/6228* (2013.01); *G06K 9/6298* (2013.01); *G06N 3/08* (2013.01)

(58) Field of Classification Search
CPC ...... G06F 21/10; G06F 21/60; G06F 21/6245; G06V 10/771; G06K 9/6298; G06N 3/08
See application file for complete search history.

(56) References Cited

U.S. PATENT DOCUMENTS

| | | |
|---|---|---|
| 10,977,384 B2 | 4/2021 | Benaloh et al. |
| 11,132,453 B2 * | 9/2021 | Wang .................... G06N 7/005 |
| 2017/0316346 A1 | 11/2017 | Park et al. |
| 2019/0147188 A1 | 5/2019 | Benaloh et al. |
| 2019/0370647 A1 | 12/2019 | Doshi et al. |
| 2020/0034565 A1 * | 1/2020 | Kim ..................... G06V 20/52 |
| 2020/0311540 A1 * | 10/2020 | Chakraborty ............ G06N 3/08 |
| 2021/0056405 A1 * | 2/2021 | Bradshaw ............ G06F 21/602 |

OTHER PUBLICATIONS

Wang, et al. (Location Privacy-Preserving Task Allocation for Mobile Crowdsensing with Differential Geo-Obfuscation), pp. 627-636. (Year: 2017).*

(Continued)

*Primary Examiner* — Daniel G Mariam
(74) *Attorney, Agent, or Firm* — Perkins Coie LLP

(57) ABSTRACT

Methods and systems that provide data privacy for implementing a neural network-based inference are described. A method includes injecting stochasticity into the data to produce perturbed data, wherein the injected stochasticity satisfies an F-differential privacy criterion and transmitting the perturbed data to a neural network or to a partition of the neural network for inference.

22 Claims, 21 Drawing Sheets

(56) References Cited

OTHER PUBLICATIONS

Hoefer, et al. (Performance Evaluation of a Differentially-private Neural Network for Cloud Computing), pp. 2542-2545. (Year: 2018).*
ISA, International Search Report and Written Opinion for International Application No. PCT/US2021/021227. dated Jul. 21, 2021. 15 pages.
Abadi, M., et al. "Deep learning with differential privacy" In Proceedings of the 2016 ACM SIGSAC Conference on Computerand Communications Security, 2016, pp. 308-318.
Beaudry, N. J., et al. "An intuitive proof of the data processing inequality" 2011. 10 pages.
Bos, J.W., et al. "Improved security for a ring-based fully homomorphic encryption scheme" Proceedings of the 14th IMA International Conference on Cryptography and Coding—vol. 8308, IMACC 2013, pp. 45-64.
Chaudhuri, K. et al. "Privacy-preserving logistic regression" Advances in Neural Information Processing Systems 21, pp. 289-296. Curran Associates, Inc., 2009.
Chaudhuri, K., et al. "Differentially private empirical risk minimization" Journal of Machine Learning Research, 2011, vol. 12, pp. 1069-1109.
Chaudhuri, K., et al. "A near-optimal algorithm for differentially-private principal components" J. Mach. Learn. Res., 2013, 14(1), pp. 2905-2943.
Cuff, P. et al. "Differential privacy as a mutual information constraint" CCS '16, 2016. 12 pages.
Dowlin, N., et al. "Cryptonets: Applying neural networks to encrypted data with high throughput and accuracy" Proceedings of the 33rd International Conference on International Conference on Machine Learning, 2016, vol. 48, pp. 201-210.
Dwork, C., et al. "Our data, ourselves: Privacy via distributed noise generation" Proceedings of the 24th Annual International Conference on The Theory and Applications of Cryptographic Techniques, EUROCRYPT'06, pp. 486-503, Berlin, Heidelberg, 2006.
Dwork, C. et al. "The algorithmic foundations of differential privacy" Found. Trends Theor. Comput. Sci., 2014, 9:211-407.
Dwork, C., et al. "Calibrating noise to sensitivity in private data analysis" Proceedings of the Third Conference on Theory of Cryptography, TCC'06, pp. 265-284, Berlin, Heidelberg, 2006.
Gentry, C. "Fully homomorphic encryption using ideal lattices" In Proc. STOC, pp. 169-178, 2009.
Hanzlik, L., et al. "MLCapsule: Guarded offline deployment of machine learning as a service" Proceedings of ACM, 2019 14 pages.
Huang, C., et al. "Generative adversarial privacy" ICML 2018 Privacy in Machine Learning and Artificial Intelligence workshop. 3 pages.
Jiang, X., et al. "Differential-private data publishing through component analysis" Transactions on data privacy, 6(1):19-34, 2013.
Kalantari, K., et al. "On information-theoretic privacy with general distortion cost functions" 2017 IEEE International Symposium on Information Theory (ISIT), pp. 2865-2869, Jun. 2017.
Kalos, M. H. et al. Monte Carlo Methods. vol. 1: Basics. Wiley-Interscience, USA, 1986. 22 pages.
Kepuska, V. et al. "Next-generation of virtual personal assistants (microsoft cortana, apple siri, amazon alexa and google home)" 2018 IEEE 8th Annual Computing and Communication Workshop and Conference (CCWC), pp. 99-103, 2018.
Kingma, D. P. et al. "Adam: A method for stochastic optimization" ICLR, 2015, 15 pages.
Kocher, P., et al. "Spectre attacks: Exploiting speculative execution" 40th IEEE Symposium on Security and Privacy (S&P'19), 2019. 20 pages.
Krizhevsky, A. "Learning multiple layers of features from tiny images" 2009. 60 pages.
Krizhevsky, A., et al. "Imagenet classification with deep convolutional neural networks" Communications of the ACM, 60:84-90, 2017.

La, H. J., et al. "A personal healthcare system with inference-as-a-service" 2015 IEEE International Conference on Services Computing, pp. 249-255, Jun. 2015.
Laine, S., et al. "Production-level facial performance capture using deep convolutional neural networks" Proceedings of the ACM SIGGRAPH/Eurographics Symposium on Computer Animation, SCA, 2017. 10 pages.
Lecun, Y. "Gradient-based learning applied to document recognition" Proceedings of the IEEE, 1998. 46 pages.
Lecun, Y. et al. "The mnist dataset of handwritten digits" online accessed May 2019 http://www:pymvpa:org/datadb/mnist:html. 10 pages.
Leroux, S., et al. "Privacy aware offloading of deep neural networks" ICML Privacy in Machine Learning and Artificial Intelligence Workshop, 2018. 3 pages.
Liao, J., et al. "A general framework for information leakage" 2017. 27 pages.
Lipp, M., et al. "Meltdown: Reading kernel memory from user space" 27th USENIX Security Symposium (USENIX Security 18), 2018. 129 pages.
Liu, Z., et al. "Deep learning face attributes in the wild" Proceedings of International Conference on Computer Vision (ICCV), Dec. 2015. 11 pages.
Narra, K. et al. "Privacy-Preserving Inference in Machine Learning Services Using Trusted Execution Environments" arXiv, 2019, 13 pages.
Newcomb, A. "Facebook data harvesting scandal widens to 87 million people" 2018. online accessed Feb. 2020 https://www:nbcnews:com/tech/tech-news/facebook-data-harvestingscandal-widens-87-million-peoplen862771. 6 pages.
Osia, S. A., et al. "A hybrid deep learning architecture for privacy-preserving mobile analytics" IEEE Internet of Things Journal, 2019, 13 pages.
Osia, S. A., et al. "Deep private-feature extraction" IEEE Transactions on Knowledge and Data Engineering, 2018. 16 pages.
Riazi, M. S., et al. "Xonn: Xnor-based oblivious deep neural network inference" Proceedings of the 28th USENIX Conference on Security Symposium, SEC'19, pp. 1501-1518, USA, 2019.
Shannon, C. E. "A mathematical theory of communication" Bell system technical journal, 27(3):379-423, 1948.
Shokri, R. et al. "Privacy-preserving deep learning" Proceedings of the 22nd ACM SIGSAC Conference on Computerand Communications Security, CCS '15, pp. 1310-1321.
Shokri, R., et al. "Membership inference attacks against machine learning models" 2017 IEEE Symposium on Security and Privacy (SP), pp. 3-18, May 2017.
Simonyan, K. et al. "Very deep convolutional networks for large-scale image recognition" ICLR 2015. 14 pages.
Soifer, J., et al. "Deep learning inference service at Microsoft" 2019 USENIX Conference on Operational Machine Learning, 2019, pp. 15-17.
Szabo, Z. "Information theoretical estimators toolbox" Journal of Machine Learning Research, 15:283-287, 2014.
Thompson, S. A. et al. "The privacy project: Twelve million phones, one dataset, zero privacy" 2019. online accessed Feb. 2020 https://www:nytimes:com/interactive/2019/12/19/opinion/location-tracking-cell-phone:html. 25 pages.
Tramer, F. et al. "Slalom: Fast, verifiable and private execution of neural networks in trusted hardware" In International Conference on Learning Representations, 2019. 19 pages.
Wang, J., et al. "Not just privacy: Improving Performance of Private Deep Learning in Mobile Cloud" Proceedings of the 24th ACM SIGKDD International Conference on Knowledge Discovery and Data Mining, Jul. 2018. 10 pages.
Warzel, C. "The privacy project: Faceapp shows we care about privacy but don't understand it" 2019. online accessed Feb. 2020 https://www:nytimes:com/2019/07/18/opinion/faceapp-privacy:html. 2 pages.
Zhang, Z. et al. "Age progression/regression by conditional adversarial autoencoder" IEEE Conference on Computer Vision and Pattern Recognition (CVPR). 2017. 9 pages.

* cited by examiner

UTKFace

METHODS OF PROVIDING DATA PRIVACY FOR NEURAL NETWORK BASED INFERENCE

This patent document is a continuation of U.S. patent application Ser. No. 17/458,165 titled "METHODS OF PROVIDING DATA PRIVACY FOR NEURAL NETWORK BASED INFERENCE", filed on Aug. 26, 2021, which is a continuation of International Application No. PCT/US21/21227, titled "METHODS OF PROVIDING DATA PRIVACY FOR NEURAL NETWORK BASED INFERENCE", filed on Mar. 5, 2021, which claims priority to and benefits of U.S. Provisional Application No. 62/986,552 entitled "METHODS OF PROVIDING DATA PRIVACY FOR NEURAL NETWORK BASED INFERENCE" filed on Mar. 6, 2020. The entire content of the before-mentioned patent applications is incorporated by reference as part of the disclosure of this document.

STATEMENT REGARDING FEDERALLY SPONSORED RESEARCH OR DEVELOPMENT

This invention was made with government support under CNS-1703812 and ECCS-1609823 awarded by the National Science Foundation. The government has certain rights in the invention.

TECHNICAL FIELD

This patent document relates to computer technologies including machine learning techniques.

BACKGROUND

Artificial neural networks (ANN) are computing systems which learn to perform tasks using examples and generally without being pre-programmed with task-specific rules. A deep neural network (DNN) is an artificial neural network with multiple layers of artificial neurons between an input layer and an output layer. DNNs can learn linear and non-linear relationships between their inputs and outputs.

SUMMARY

The techniques disclosed herein can be implemented in various embodiments to achieve, among other features and benefits, finding optimal stochastic perturbations to obfuscate features of the private data before it is sent to a neural network for inference.

Methods and systems which allow finding optimal stochastic perturbations to obfuscate features of the private data before the data is sent to a neural network which performs an inference task on the data are described. To this end, the methods according to the disclosed technology may be used by embodiments to reduce the information content of the transmitted perturbed data relative to the unperturbed data while conserving essential pieces of the data that enable an inference request to be serviced accurately by the neural network One aspect of the disclosed embodiments relates to a method of providing data privacy that includes specifying a value of a parameter $\lambda$ related to trade-off between an accuracy of inference done by a neural network (NN) on a perturbed input of the NN and a degree of mutual information degradation between a raw input of the NN and the perturbed input of the NN. The method further includes, for each feature of a data instance, providing a Laplace distribution corresponding to the feature, wherein the Laplace distribution has parameters of location M and scale B. The method also includes forming a tensor of locations $M_T$ and a tensor of scales $B_T$ using the parameters of the Laplace distributions provided for the features of the data instance. The method further includes providing a loss function L having a term proportional to log(B), wherein tensor B is related to the tensor of scales $B_T$, and a term proportional to a product of the value of the parameter $\lambda$ and a utility loss function Lnn of the neural network, wherein the utility loss function Lnn can be used to train the neural network to perform an inference task T. The method also includes finding optimized elements of $B_T$ and $M_T$ by optimizing, using the loss function L, accuracy of the inference task T performed by the neural network. The method further includes, for each feature of the data instance, determining values of optimized parameters of location M and scale B of the Laplace distribution corresponding to the feature using the optimized elements of $B_T$ and $M_T$.

Another aspect of the disclosed embodiments relates to a method of providing data privacy for neural network computations that includes, for a given privacy budget F and for a target inference task to be performed by a neural network, finding optimized parameters of a set of statistical distributions which optimize performance of the neural network on the inference task and with respect to the privacy budget F using a loss function L, wherein the loss function L has a term related to a tensor, wherein the tensor is related to a parameter of at least one distribution from the set of statistical distributions and another term related to a utility loss function Lnn of the neural network for the target inference task. The method further includes selecting, for each feature of an input, a perturbation value drawn from a distribution in the set of statistical distributions which has the optimized parameters and adding the perturbation value to a value associated with the feature to obtain a perturbed input. The method also includes sending the perturbed input to the neural network. The method further includes performing the target inference task by the neural network on the perturbed input.

Yet another aspect of the disclosed embodiments relates to a data processing method that includes determining parameters of a distortion operation by which a source data is converted into a distorted data. The method also includes performing a data processing task on the distorted data.

An aspect of the disclosed embodiments relates to a method of providing privacy for data that includes injecting stochasticity into the data to produce perturbed data, wherein the injected stochasticity satisfies an F-differential privacy criterion. The method further includes transmitting the perturbed data to a neural network or to a partition of the neural network for inference.

Another aspect of the disclosed embodiments relates to a method of providing privacy for data that includes determining, for a pre-trained deep neural network (DNN), an amount of stochastic perturbation, applying the amount of the stochastic perturbation to source data to obtain perturbed source data, and transmitting the perturbed source data to the DNN or to a partition of the DNN.

Yet another aspect of the disclosed embodiments relates to a method of providing privacy for data that includes determining an amount of stochastic perturbation in a source data without accessing sensitive information or labels associated with the source data. The method further includes transmitting, to a neural network or to a partition of the neural network, a perturbed data obtained by perturbing the source data using the amount of stochastic perturbation.

An aspect of the disclosed embodiments relates to a communication apparatus that includes a memory and a processor, wherein the processor is configured to read code from the memory and implement a method according to the technology disclosed in this patent document.

Another aspect of the disclosed embodiments relates to a non-transitory computer-readable medium storing instructions that, when executed by a computer, cause the computer to perform a method according to the technology disclosed in this patent document.

DETAILED DESCRIPTION

Figure 1:
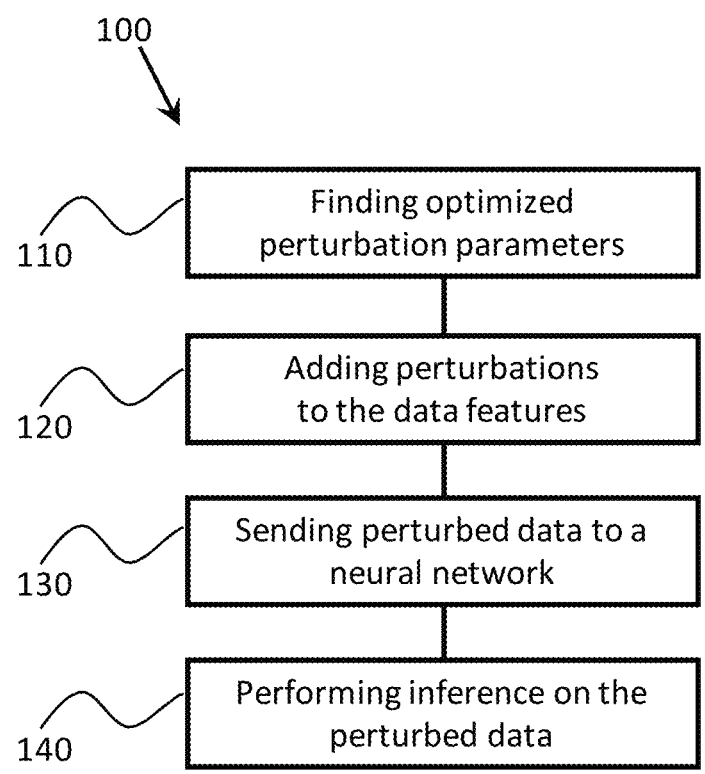
FIG. 1 shows a flow diagram of an example embodiment of a method according to the technology disclosed in this patent document.

INFerence-as-a-Service (INFaaS) in the cloud has enabled the prevalent use of Deep Neural Networks (DNNs) in home automation, targeted advertising, machine vision, etc. The cloud receives an inference request as an input which can contain a rich set of private information that can be misused or leaked, possibly inadvertently. This prevalent setting can compromise the privacy of users during the inference phase. Therefore, there is a need in data processing and data communication methods that can ensure privacy of the user data without any significant sacrifice of the neural network's performance on inference tasks.

The technology disclosed in this patent document provides methods and systems which allow finding optimal stochastic perturbations to obfuscate features of the private data before it is sent to the cloud. To this end, the methods according to the disclosed technology reduce the information content of the transmitted perturbed data relative to the unperturbed data while conserving essential pieces of the data that enable an inference request to be serviced accurately by a DNN. Methods and systems according to the technology disclosed in this patent document improve computer technology by improving capabilities of computers to ensure privacy of data they process while preserving accuracy of the computations that the computers perform on the data.

Methods according to the disclosed technology can use gradient-based optimization of a pre-trained DNN (the DNN having known weights optimized for an inference task) to obtain optimal parameters of distributions of the stochastic perturbations used to obfuscate the data features. The obfuscated data is subsequently sent to the neural network which performs the inference task on the data.

For example, some embodiments of the methods disclosed in this patent document use Laplace distribution as a parametric model for the stochastic perturbations and can obtain optimal parameters for a set of perturbation Laplace distributions using Monte Carlo sampling of those distributions during a gradient descent-based optimization using a pre-trained neural network. The obtained set of Laplace distributions is used to perturb private data while retaining the neural network's ability to perform the inference task the neural network is pre-trained to perform.

Methods according to the technology disclosed in this patent application also allow guaranteeing that the stochasticity injected into the input data using the methods satisfies the F-differential privacy criterion.

In some embodiments of the technology disclosed herein, the desired privacy budget $\varepsilon$ is incorporated as a constraint in a loss function L of a pre-trained neural network which also incorporates parameters of stochastic perturbations (e.g., parameters of a set of Laplace distributions). Optimal values of the parameters of stochastic perturbations are obtained by using L to maximize the accuracy of an inference task performed by the pre-trained neural network with respect to the privacy budget constraint.

In certain embodiments, methods according to the disclosed technology provide a way to control a tradeoff between the mutual information (MI) between an input of a pre-trained DNN and a perturbed representation of the input and accuracy of the inference task performed by the DNN. In some implementations, this tradeoff is controlled using a Lagrange multiplier incorporated into a loss function of the DNN.

According to some embodiments, parameters of the distributions of the stochastic perturbations are determined before providing a sensitive input to the pre-trained DNN followed by sampling a random perturbation tensor from the determined distributions, adding the tensor to the sensitive input, and sending thus perturbed input to the DNN for inference.

In some implementations of the technology disclosed in this patent document, a data instance is considered as a dataset and features of the data instance are considered as records of the dataset. For instance, for images, the data instance can be an image and the features can be the image pixels. Protecting sensitive information in an image could be achieved by adding noise to the image features (e.g., pixels) through an F-deferentially private mechanism according to an implementation of the technology disclosed in this patent document, which makes the features of the image less distinguishable.

FIG. 1 illustrates steps of a method 100 of providing data privacy for neural network based computations according to an embodiment of the technology disclosed in this patent document.

Step 110 of the method 100 includes, for a given privacy budget F and for a target inference task to be performed by a neural network, finding parameters of a set of statistical distributions which optimize performance of the neural network on the inference task and with respect to the privacy budget F using a loss function L, wherein the loss function L has a term related to a tensor (e.g., a term proportional to a logarithm of the tensor), wherein the tensor is related to a parameter (e.g., a scale) of at least one distribution (e.g., a Laplace distribution) from the set of statistical distributions (for example, elements of the tensor are scales of the Laplace distributions) and another term related to (e.g., proportional to) a utility loss function Lnn of the neural network for the target inference task.

Step 120 of the method 100 includes selecting, for each feature of an input, a perturbation value drawn from a distribution in the set of statistical distributions which has parameters optimized in Step 110 of the method and adding the perturbation value to a value associated with the feature to obtain a perturbed input.

In Step 130 of the method 100, the perturbed input is sent to the neural network which performs the target inference task on the perturbed input in Step 140 of the method 100.

Figure 2:
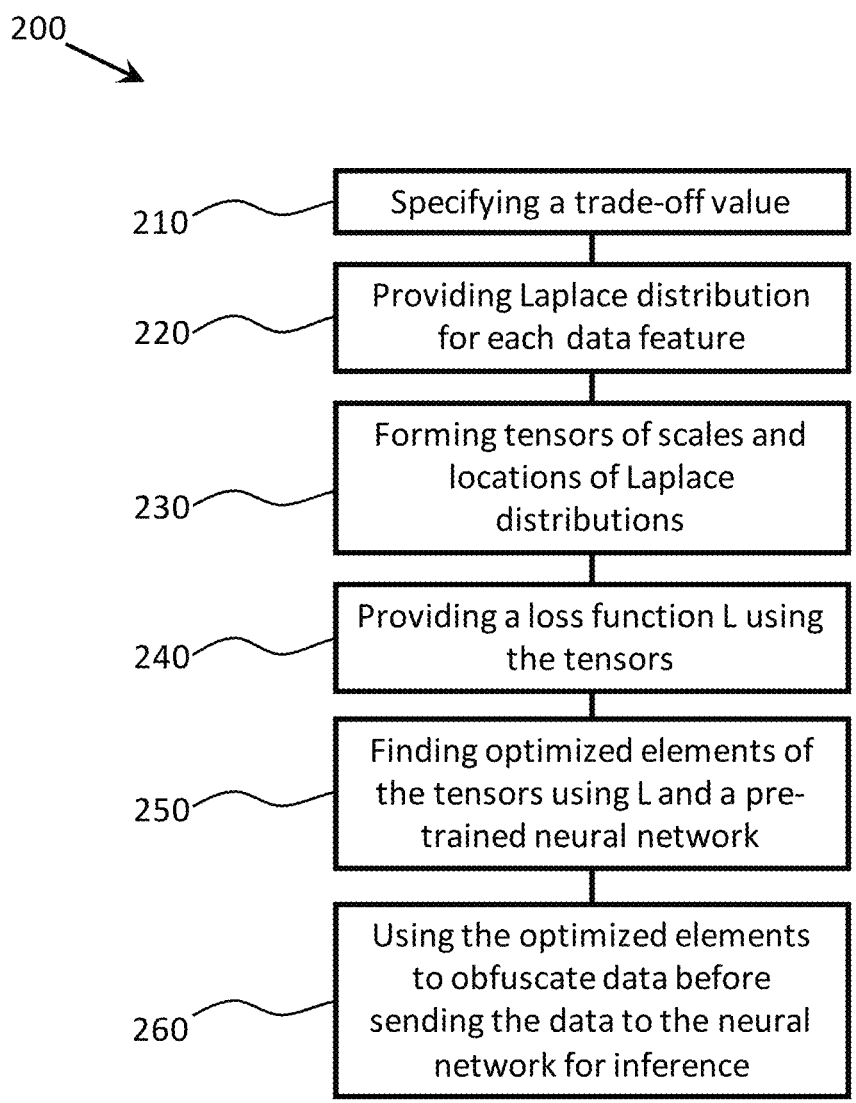
FIG. 2 shows a flow diagram of an example embodiment of another method according to the technology disclosed in this patent document.

FIG. 2 illustrates steps of a method 200 of providing data privacy for neural network based computations according to an embodiment of the technology disclosed in this patent document.

Step 210 of the method 200 includes specifying a value of a parameter $\lambda$ related to trade-off between an accuracy of inference done by a neural network on a perturbed input and a degree of mutual information degradation between a raw input and the perturbed input of the neural network.

The less mutual information exists between the raw and perturbed inputs, the higher the level of data privacy provided through perturbing the raw inputs. However, increasing the privacy level can negatively affect the accuracy of an inference task performed by the neural network on the perturbed inputs.

The methods disclosed in this patent document, such as the method 200, for example, allow controlling a ratio between the degree of loss of private information in the data achieved through an obfuscation mechanism implemented according to the disclosed technology and the degree of accuracy loss for a target inference task a user wants a neural network to perform on the obfuscated data.

Step 220 of the method 200 includes providing, for each feature of a data instance, a Laplace distribution corresponding to the feature, wherein the Laplace distribution has parameters of location M and scale B. For example, the data instance can be an image (e.g. a photo or a frame of a video) and pixels of the image can be its features. Methods according to the disclosed technology apply differential privacy to obfuscate personal/sensitive features within a data instance.

Step 230 of the method 200 includes forming a tensor of locations $M_T$ and a tensor of scales $B_T$ using the parameters of the Laplace distributions provided for the features of the data instance. Tensors $M_T$ and $B_T$ can have the same shape as the data tensor D of the data instance.

Step 240 of the method 200 includes providing a loss function L having a term proportional to log(B), wherein tensor B is obtained using the tensor $B_T$, and a term proportional to the product of the value of the parameter $\lambda$ and a utility loss function Lnn of the neural network for a target inference task T.

In some embodiments of the methods disclosed in this patent document, the neural network can be pre-trained to perform the inference task T. In some embodiments, the neural network is pre-trained to perform the inference task T using the utility loss function Lnn.

Step 250 of the method 200 includes finding optimized elements of tensors $B_T$ and $M_T$ by optimizing accuracy of the inference task T performed by the neural network using the loss function L.

In some implementations, Step 250 can include a sub-step 250A of drawing multiple samples of a noise tensor (a perturbation tensor) using the Laplace distributions provided for the data instance features, averaging over the losses associated with the samples of the perturbation tensor, and applying an update using the obtained average. In other implementations, only a single sample of the perturbation tensor is used. Generally, the perturbation tensor can have the same shape as the data tensor D of the data instance.

Step 260 of the method 200 includes determining, for each feature of the data instance, values of optimized parameters of location M and scale B of the Laplace distribution corresponding to the feature using the optimized elements of $B_T$ and $M_T$.

Methods according to the disclosed technology can further include a step of selecting, for each feature of a raw input data instance $D_R$ of the neural network, a perturbation value x from the Laplace distribution corresponding to the feature and adding the perturbation value x to a value of the feature to produce a perturbed input data instance $D_P$.

Methods according to the disclosed technology can also include a step of sending the perturbed input data instance $D_P$ to the neural network for inference. In some embodiments, the neural network can reside in a cloud while the methods according to the disclosed technology can be implemented on a user device (e.g., a smartphone). The perturbed data can be sent to the neural network via one or more communication networks (e.g., Internet and/or a cellular network).

In some embodiments, the neural network can reside on the same device (e.g., a smartphone, a personal computer, or a computer server) which implements the methods disclosed in this patent application. In such a case, applying the disclosed methods to obfuscate raw data obtained using the device (e.g., using a smartphone camera) or transmitted to the device from an external data source (e.g., sent to a server over a network) can be beneficial to avoid potential breaches of privacy of the data when, for example, storage of the data on the device (in any form suitable for data storage) is performed in connection with processing of the data by the neural network on the device.

Figure 3:
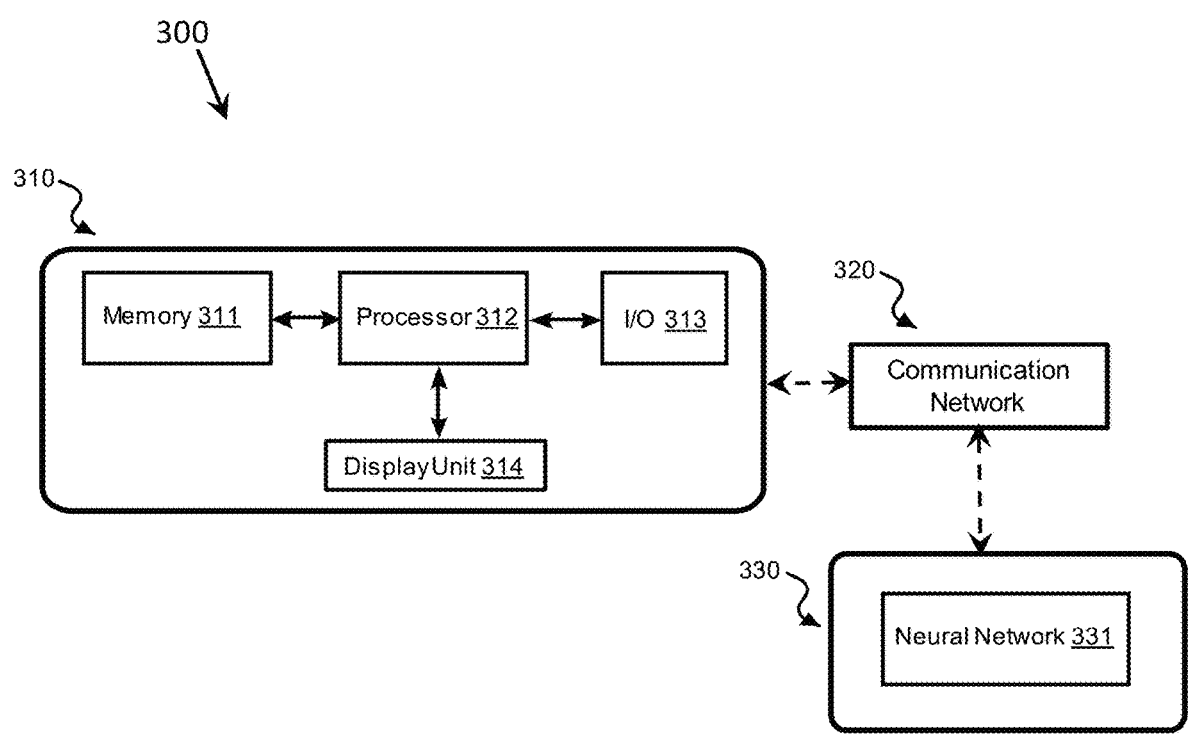
FIG. 3 shows an example system which can be used to implement one or more methods according to the technology disclosed in this patent document.

FIG. 3 shows an example embodiment of a system 300 which can be used to implement one or more methods according to the technology disclosed in this patent application. System 300 can include, for example, an edge device 310, a communication network 320, and a cloud-based device 330.

The edge device 310 can include a memory 311, a processor 312, and a data input/output (I/O) interface 313. The memory 311 of the device 310 stores a code which, when executed by the processor 312 makes the device 310 implement one or more methods according to the technology disclosed herein. In some embodiments, device 310 can be a smartphone, a laptop, a personal computer, or an embedded computer.

By implementing the one or more methods according to the technology disclosed in this patent document, the device 310 transforms raw data into perturbed data which is sent by the device 310 via its I/O 313 and over a communication network 320 (e.g., the Internet and/or a wireless network) to a cloud-based device 330 (e.g., a server). The device 330 hosts a neural network 331 which is configured to perform an inference task T. The device 330 receives the perturbed data sent to it by the edge device 310 over the communication network 320 and provides the perturbed data as an input data to the neural network 331 which performs the inference task T on the data. Results of the inference task T performed by the neural network 331 can be sent to the device 310 over the communication network 320 and, for example, displayed to a user of the device 310 using, for example, a display unit 314 of the device 310.

Figure 4:
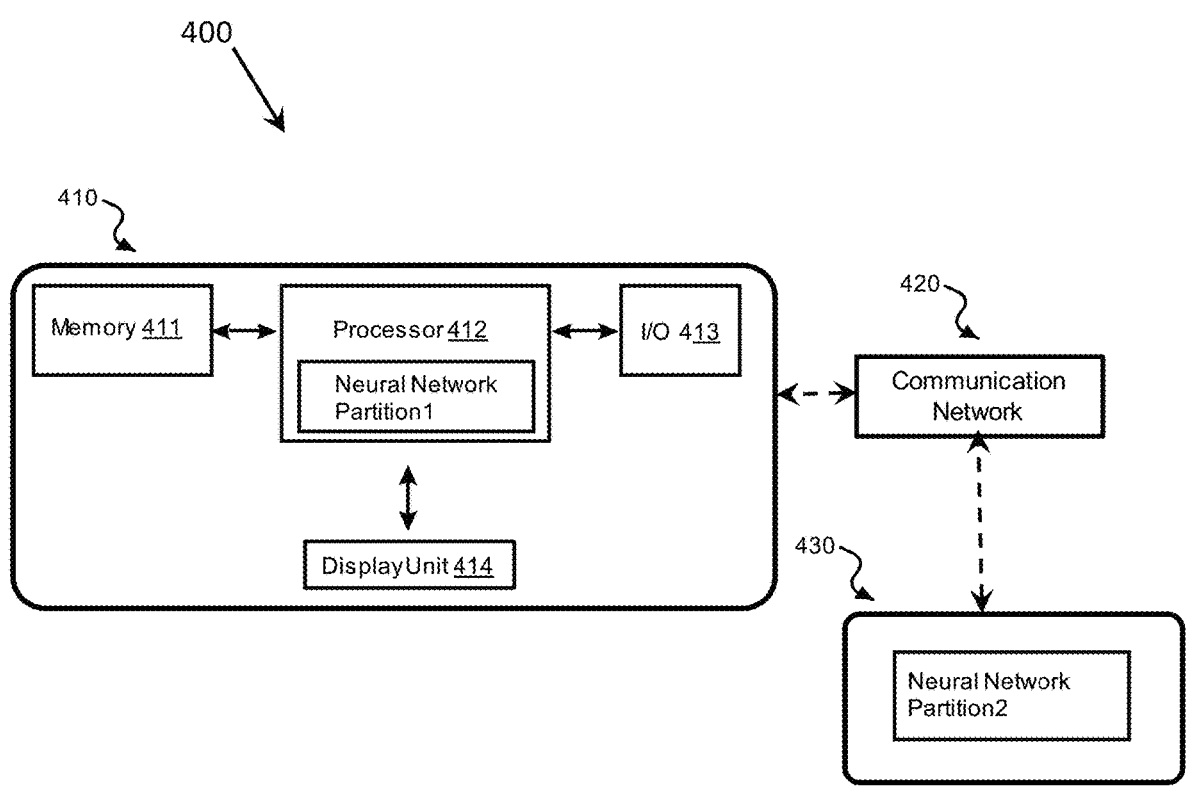
FIG. 4 shows another example system which can be used to implement one or more methods according to the technology disclosed in this patent document.

FIG. 4 shows an example embodiment of a system 400 which can be used to implement one or more methods according to the technology disclosed in this patent application. System 400 can include, for example, an edge device 410, a communication network 420, and a cloud-based device 430.

The edge device 410 can include a memory 411, a processor 412, and a data input/output (I/O) interface 413. The memory 411 of the device 410 stores a code which, when executed by the processor 412 makes the device 410 implement one or more methods according to the technology disclosed herein. In some embodiments, device 410 can be a smartphone, a laptop, a personal computer, or an embedded computer.

By implementing the one or more methods according to the technology disclosed in this patent document, the edge device 410 transforms raw data into perturbed data. The perturbed data or a part of the perturbed data can be provided to Partition 1 of a neural network which resides in the processor 412 of the device 410 through a data bus and/or an application programming interface (API) call. The perturbed data or a part of the perturbed data can also be provided to Partition 2 of the neural network which resides at a remote location (e.g., a remote cloud-based server) through I/O 413 of the device 410 and over the communication network 420.

According to the embodiments illustrated in FIG. 3 and FIG. 4, the disclosed technology may be implemented in systems in which the neural network may be implemented entirely on a processor or a processor cluster that determines the perturbation, or the neural network may be partitioned into a first partition that is executed on the processor/processor cluster and a second partition that is remotely located using remote computational resources such as a cloud based computing service, or a combination of the two.

Figure 5:
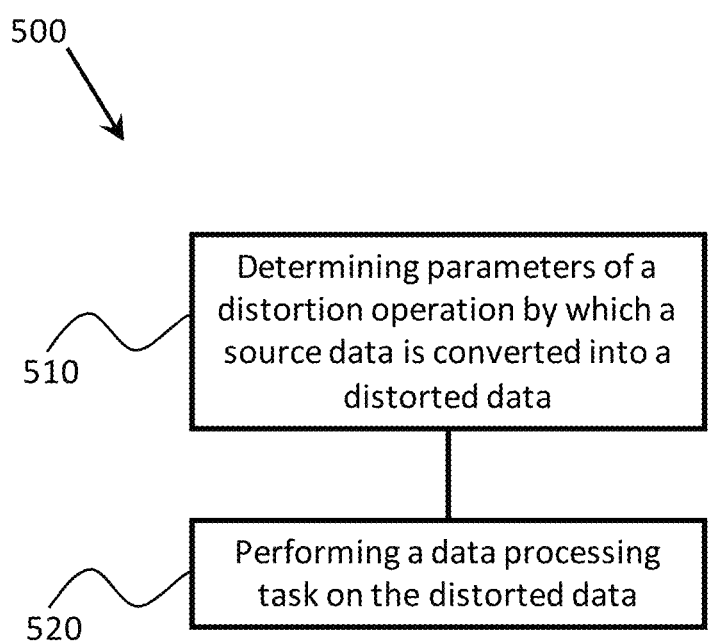
FIG. 5 shows a flow diagram of an example embodiment of a data processing method according to the disclosed technology.

FIG. 5 shows a flow diagram of an example embodiment of a data processing method 500 according to the disclosed technology. Step 510 of the method 500 includes determining parameters of a distortion operation by which a source data is converted into a distorted data. Step 520 of the method 500 includes performing a data processing task on the distorted data.

Figure 6:
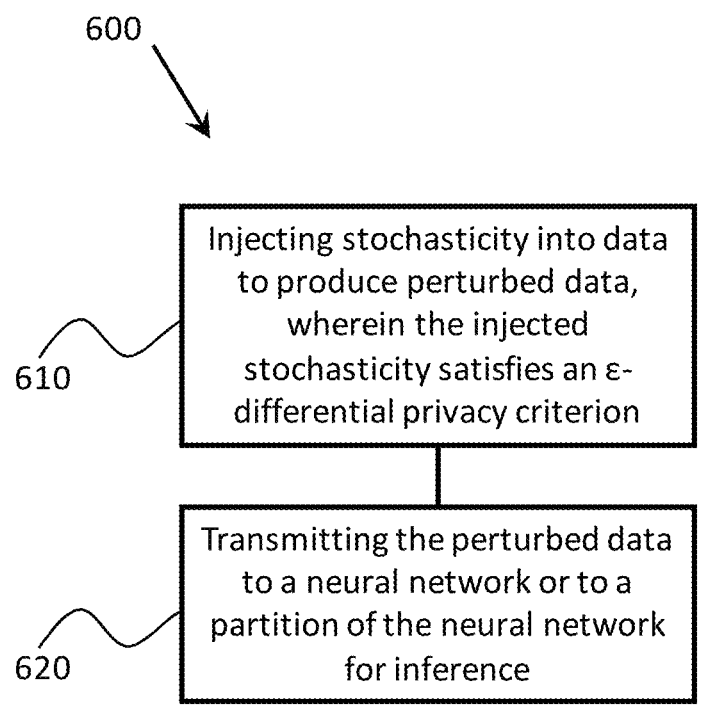
FIG. 6 shows a flow diagram of an example embodiment of a method of providing privacy for data according to the technology disclosed in this patent document.

FIG. 6 shows a flow diagram of an example embodiment of a method 600 of providing privacy for data according to the technology disclosed in this patent document. Step 610 of the method 600 includes injecting stochasticity into the data to produce perturbed data, wherein the injected stochasticity satisfies an F-differential privacy criterion. Step 620 of the method 600 includes transmitting the perturbed data to a neural network or to a partition of the neural network for inference.

Figure 7:
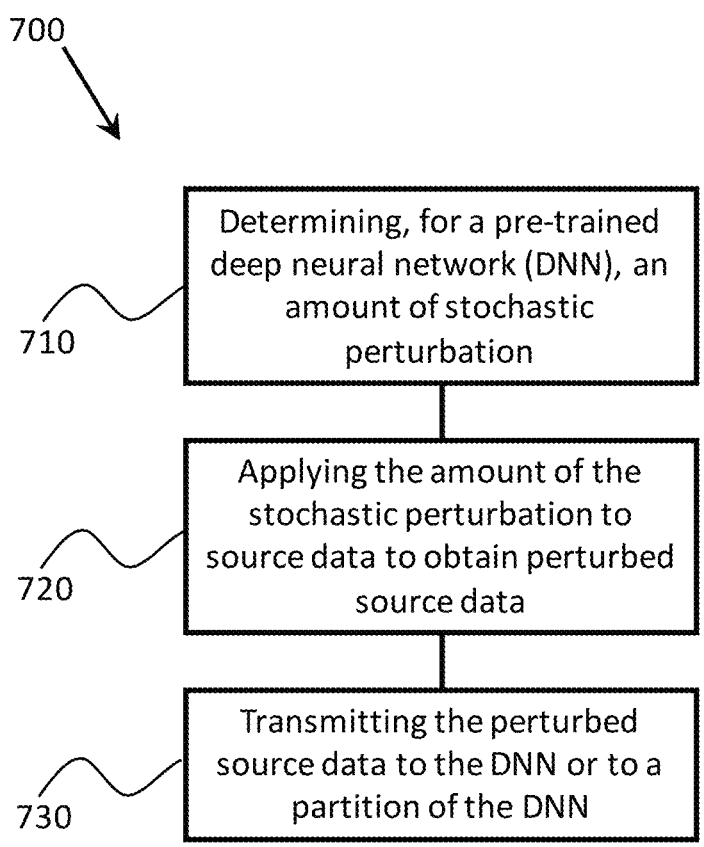
FIG. 7 shows a flow diagram of another example embodiment of a method of providing privacy for data according to the technology disclosed herein.

FIG. 7 shows a flow diagram of an example embodiment of a method 700 of providing privacy for data according to the technology disclosed herein. Step 710 of the method 700 includes determining, for a pre-trained deep neural network (DNN), an amount of stochastic perturbation. Step 720 of the method 700 includes applying the amount of the stochastic perturbation to source data to obtain perturbed source data. Step 730 of the method 700 includes transmitting the perturbed source data to the DNN or to a partition of the DNN.

Figure 8:
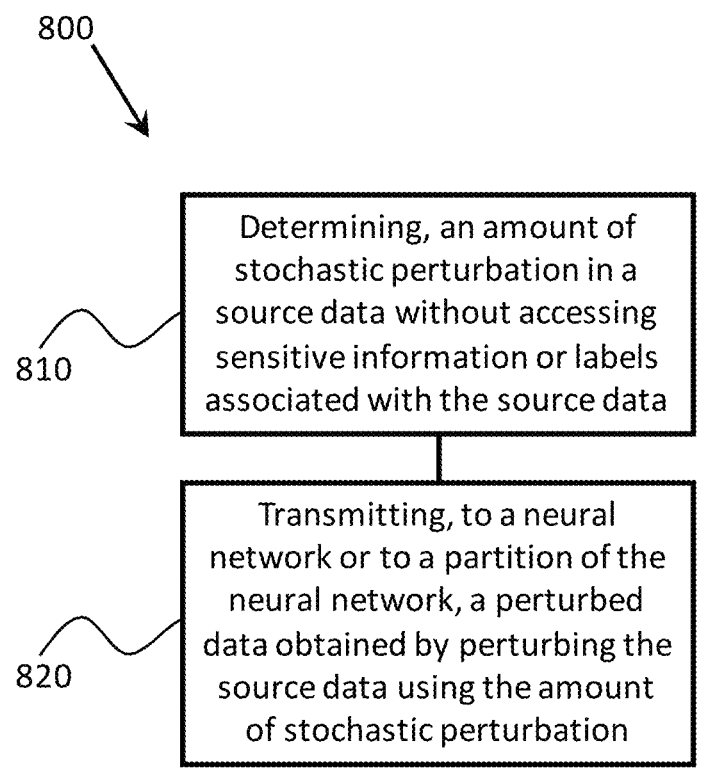
FIG. 8 shows a flow diagram of yet another example embodiment of a method of providing privacy for data according to the technology disclosed in this patent document.

FIG. 8 shows a flow diagram of an example embodiment of a method 800 of providing privacy for data according to the technology disclosed in this patent document. Step 810 of the method 800 includes determining, an amount of stochastic perturbation in a source data without accessing sensitive information or labels associated with the source data. Step 820 of the method 800 includes transmitting, to a neural network or to a partition of the neural network, a perturbed data obtained by perturbing the source data using the amount of stochastic perturbation.

As mentioned above, the success of deep learning in many areas including vision, recommendation systems, natural language processing, etc., has heralded the adoption of Deep Neural Networks (DNNs) in production systems. However, the computational complexity of DNNs has pushed their execution to mostly cloud infrastructure, where an edge device on the user side captures and sends the raw inputs (requests) to the cloud for inference. This execution model, called INFerence-as-a-Service (INFaaS), has become defacto (e.g., mobile phones), yet it poses serious privacy concerns.

The threat is that as soon as the raw data is sent to the cloud, it can be misused or leaked through security vulnerabilities even if the cloud provider and/or the communication link is trusted. Such a risk is present for every single request (input) and is exacerbated by the fact that the raw inputs contains a rich set of information that is not directly relevant to the inference task. The technology disclosed in this patent document (referred to as "Cloak" below) provides a systematic approach towards providing a differentially private inference mechanism by adding perturbations to the primary input (request). An unprincipled addition of perturbations will lead to significant loss in the inference accuracy, putting the service in the position of questionable utility.

To address these challenges, the technology disclosed in this patent document which we termed "Cloak" formulates the discovery of the perturbation as an offline gradient-based optimization problem that reformulates a pre-trained DNN (with optimized known weights) as an analytical function of the stochastic perturbations. Using Laplace distribution as a parametric model for the stochastic perturbations, Cloak learns the optimal parameters using gradient descent and Monte Carlo sampling. With this setup, these learned distributions can obfuscate the private data while retaining the cloud's ability to perform the inference task. This set of optimized Laplace distributions further guarantee that the learned perturbations meet the F-differential privacy criterion. To meet F (the desired privacy budget), we incorporate it as a hard constraint in Cloak's loss function to maximize the accuracy with respect to this constraint. Cloak takes a further step after achieving the highest accuracy for a given F and explores an alternative space by reducing Mutual Information (MI) between the original input and its perturbed representation. This approach opens a trade-off between accuracy and information content of the perturbed input that is controlled using a Lagrange multiplier that acts as a knob.

It worth emphasizing that Cloak's learning process is offline and is not invoked during inference. For each inference request, a distinct random perturbation tensor is sampled from the learned distributions and is added to the raw input.

Cloak offers these capabilities with a stark contrast with recently emerging line of work on using noise for inference privacy that require to know what they are protecting against (i.e., a private label). Cloak, however, does not need this extra labeling and it attempts at removing any excessive information that is not conducive to the main inference task/label. Additionally, unlike these techniques, Cloak does not need to change parameters or the architecture of the pre-trained networks. Instead, it produces a significantly perturbed representation of the input, aiming to only provide just enough information to serve the inference task (FIG. 1). Furthermore, the aforementioned works do not directly learn the perturbations. Finally, Cloak does not impose the prohibitive computational cost of techniques that use homomorphic encryption which can increase the execution time of a neural network by three orders of magnitude.

Figure 9:
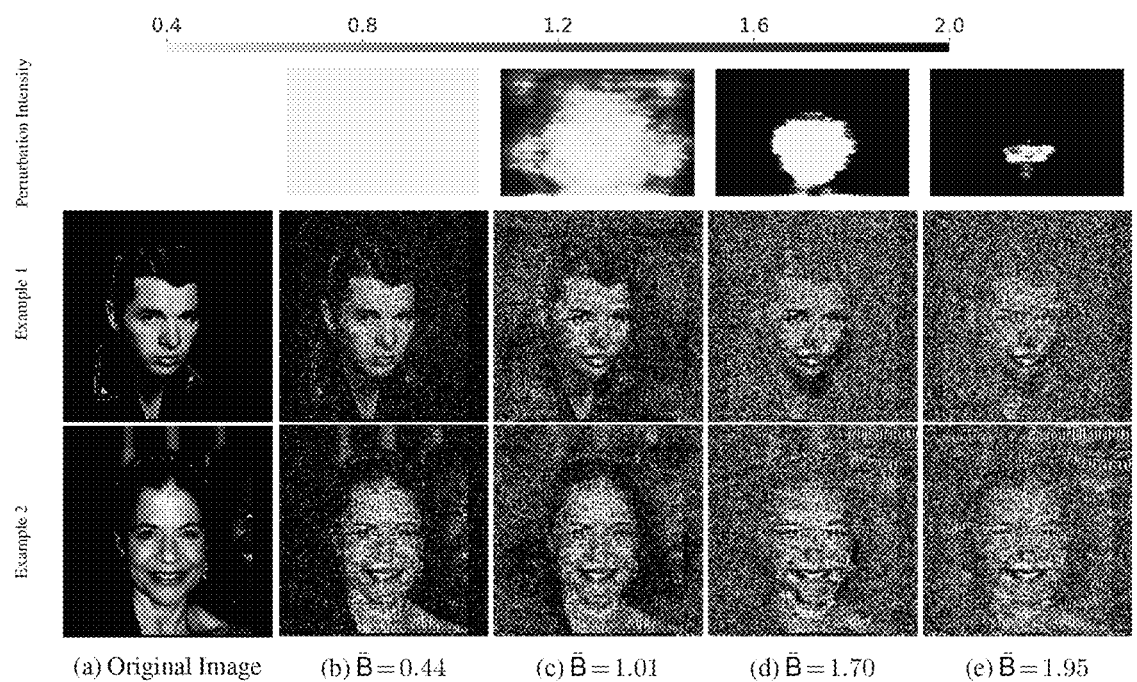
FIG. 9 illustrates effects of an example method according to the disclosed technology on input images as the average scale of perturbations is increased.

FIG. 9 illustrates an effect of an example method according to the disclosed technology on the input images as we increase the average scale of perturbations 3 that is proportional to the standard deviation. The non-sensitive classification task is smile detection. The first row of the image in FIG. 9 shows the heat map of perturbation scales for each pixel. At higher scales, the example method according to the disclosed technology obfuscates the features that are non-conducive to the smile detection task e.g. the background, the hair, etc., while only the lips and some minor facial attributes remain recognizable.

We provide an analytical formulation of the stochasticity learning problem as a constrained convex optimization program that maximizes the privacy by minimizing the mutual information between the raw input and the data sent to the cloud subject to a restriction on the degradation of the DNN utility (accuracy). Cloak's objective function and the constraint both depend on the prior distribution of the perturbation. However, for a fixed parameterized family of distributions and a fixed value of the Lagrange multiplier knob, the problem has a unique global optima. The convexity of the formulation guarantees that the gradient descent will converge to that global optima. This proves that Cloak maximizes the privacy under the utility preserving constraint. Further, we prove Cloak satisfies differential privacy guarantees with respect to the features of the input. The per-feature guarantee ensures that an adversary cannot use the spatio-temporal correlations to reverse engineer the process and gain access to the sensitive information.

Experimental evaluation with real-world datasets of UTK-Face, CIFAR-100, and MNIST shows that Cloak can reduce the mutual information content of input images by 80.07% with accuracy loss of 7.12% for an F of 2.5. The large dimensions of images in the CelebA dataset prevent the accurate estimation of mutual information. As such, we take a practical approach towards evaluation of this dataset. First, we visualize the effects of Cloak pictorially on FIG. 9. Then, we select the inference service as "smile detection" on this dataset. The results show that Cloak reduces the accuracy of a malevolent DNN classifier that aims to infer "gender," from 96.7% to 65.7%-reduction of 31.0%. This significant reduction is achieved while Cloak does not assume or incorporate anything about the label, feature, or sensitivity (privacy) of "gender." Additionally, Cloak preserves the accuracy of "smile detection" service at 87.2%-only 4.9% accuracy degradation.

We define function $f$, to be the target function the output of which is to be perturbed. This could be any pre-processing (e.g., normalization) carried out on the raw input data, before being handed to the untrusted party. In particular, this function can be the identity function if there is no pre-processing steps. We also define function g to be the neural network computation which is to be executed by the untrusted party.

Definition 1. F-Differential Privacy ($\epsilon$-DP). For c>0, an algorithm A satisfies &-DP if and only if for any pair of datasets D and D' that differ in only one element:

$$P[A(D)=t] \le e^t P[A(D')=t] \forall t \qquad (1)$$

where, $P[A(D)=t]$ denotes the probability that the algorithm A outputs t. DP tries to approximate the effect of an individual opting out of contributing to the dataset, by ensuring that any effect due to the inclusion of one's data is small.

$f$ and a fixed $\epsilon \ge 0$, the randomizing algorithm $A_f(D)=f(D)+x$ where x $\Delta f$ $f$, and is defined as $\Delta f = \sup |f(D)-f(D')|$ over the all dataset pairs (D,D') that differ in only one element.

The amount of mutual information between the raw data and the representation that is to be publicized is another measure of privacy that is widely used in literature. Cloak aims to minimize the mutual information between the raw input (D) and its perturbed representation, $A_f(D)$, that was attained via the randomization algorithm $A_f$. We can bound this mutual information by $$\begin{aligned} I(D; A_f(D)) &\le I(f(D); A_f(D)) \\ &= H(A_f(D)) - H(A_f(D) \mid f(D)) \\ &= H(A_f(D)) - H(x) \\ &\le H(f(D)) - H(x) \\ &= H(f(D)) - \log(2be) \end{aligned} \qquad (2)$$

where, H(•) represents the Shannon entropy. Here, we assume x is distributed as $Lap(\mu,b)$, i.e., b is the scale of the Laplace distribution. The first inequality follows from the data processing inequality. The first term in the last line of Equation (2) depends on the target function $f$ and is a constant with respect to the optimization variable x in our case. Hence, we do not consider it for our optimization. The second term can be written as $-\log(2be)=-\log(2e)-\log(b)$, where $-\log(2e)$ is constant. Thus, if we minimize $-\log(b)$, i.e., maximize the scale of the distribution of perturbations, we have minimized an upper bound on the mutual information of the leaked data.

(D), Cloak adds a distinct randomly generated perturbation tensor (X)

g. During the inference phase no optimization is performed. X is generated by sampling each element, x, independently, from a Laplace distribution $Lap(\mu,b)$, where $\mu$ and b are the corresponding elements of the locations (M) and scales tensors (B).

In a separate offline process, Cloak finds these M and B tensors by solving an optimization problem. Cloak trains the locations and scales tensors in such a way that: (1) provides the required differential privacy guarantee, as defined shortly; (2) incurs minimum degradation to the neural network's objective, and, (3) decreases the amount of mutual information between the original tensor D and its noisy, perturbed version, $A_f(D)$. When the desired tensors M and B are found, they are used for perturbing input data for inference, in deployed neural networks as mentioned above.

The goal of differential privacy is to guarantee that one cannot infer whether an individual data instance was in the dataset by observing an algorithm's output. In Cloak's problem setting, we apply differential privacy to obfuscate personal/sensitive features, within each data instance. This problem can be looked upon as trying to make the changes in one feature within the data instance indistinguishable. As such, we define an instantiation of differential privacy, where a data instance is considered as a dataset and features are considered records of this dataset, as feature differential privacy. For instance, in images, the features can be the pixels, and one attempt at protecting sensitive information in the image could be adding noise through a deferentially private mechanism, so as to make pixels less distinguishable. In this case, the datasets D and D' can be two identical images that only differ in one pixel.

Cloak aims at casting the noise distribution parameters as a trainable tensor, and using conventional gradient based methods to train them. To be able to define gradients over the locations and scales, we rewrite the noise sampling to be $X = B \circ E + M$, instead of $X \sim Lap(M,B)$, where E is a tensor with the same shape as the data tensor (D) and is sampled i.i.d from $Lap(0,1)$ and $\circ$ is the element-wise multiplication. This redefinition enables us to formulate the problem as an analytical function for which we can calculate the gradients.

To achieve the differential privacy guarantee, the elements of B must be larger than $$\frac{\Delta f}{\varepsilon}.$$

We define a to-be-tuned hyper-parameter $M_x$ as an upper bound and reparameterize the scales tensor B as P:

$$B = \frac{1.0 + \tanh(P)}{2}\left(M_x - \frac{\Delta f}{\varepsilon}\right) + \frac{\Delta f}{\varepsilon} \quad (3)$$

As discussed experimentally later, $M_x$ is usually between 1.5 to 2.5. We put this extra constraint on the distributions, so that none of the noise elements gets a very high scale and becomes an outlier compared to the scale of other noise elements.

Differential privacy offers a worst-case privacy guarantee. Cloak, however, decreases the mutual information between the input data and its perturbed representation, while maintaining the desired differential privacy guarantee. The reduction in mutual information can be considered as an average-case privacy measure.

As discussed, the mutual information between tensors D and $A_f(D)$ where the latter is acquired by injecting noise to $f(D)$, is proportional to the log of the standard deviation of the noise that is added to each feature (element) in $f(D)$. Therefore, Cloak needs to maximize the scales of the noise distributions to minimize the leaked mutual information.

Increasing the scale parameters of noise elements through training must be done in consideration of the neural network's objective. For instance, in a setting where the task is smile detection, some facial features like the mouth are conducive to this detection. Other features, however, such as that person's hair, the background, their eye color, etc. are irrelevant. Thus, adding more noise to these features can achieve higher privacy in terms of information loss, while incurring minimum degradation to the utility.

An example of noise injection can be seen in FIG. 9, where the effect of increase in the average of the noise scales is illustrated for two sample images from the CelebA dataset. In this illustration, Cloak causes non-conducive features to get blurry by increasing the scales. For the rightmost images, only the smile and some minor facial attributes are present. For instance, notice the second example image where the other person in the background fades away as the noise increases. The mean accuracy drop over the test portion of the dataset for the four perturbation distribution sets (four sets of tensors B and M) in this Figure are 3.4%, 3.7%, 4.5% and 12.7% respectively, with standard deviations in the 0.12%-0.68% range. The privacy budget ($\varepsilon$) is 2.5.

Such a rather targeted (non-uniform) obfuscation behavior that leads to low degradation in accuracy for a given F is the result of our formulation that incorporates mutual information in Cloak's loss function. If only the differential privacy constraint was considered, the noise would have just been increased uniformly across the image and accuracy loss would have been much higher.

Cloak's objective function is to minimize the mutual information (or maximize the noise variance as discussed before) subject to a bounded degradation in the neural network's utility. Using Lagrange multiplier $\lambda$ and given our reparameterization of B, we can express the loss function of Cloak as $$L(M,B) = -\log B + \lambda L_m(M,B) \quad (4)$$

where, $L_{nn}$ represents the utility loss function of the neural network. For instance, in the case of C-class classification, this utility can be represented as $$L_{nn}(M, B) = -\frac{1}{n}\sum_{i=1}^{n}\sum_{c=1}^{C} y_c^i \log(p_c^i),$$

which is the cross entropy loss, where $p_c^i$ is the $i^{th}$ Monte Carlo sample of the probability the neural network has assigned to observation i belonging to class c, and, $y_c^i$ is the indicator function of whether the $i^{th}$ sample belongs to the class c. Converting the averaging over n samples into the population expectation, we can rewrite our loss function as $$L(M, B) = -\log B + \lambda E_{X \sim L(M,B)}\left[\sum_{c=1}^{C} y_c \log(g(f(D) + X)_c)\right] \quad (5)$$

We take sufficiently large n noise samples drawn from the current locations and scales tensors to approximate the second term. This means that to apply a single update to the trainable parameters, Cloak runs multiple forward passes on the entire neural network, at each pass draws new samples for the noise (perturbation) tensor, and averages over the losses and applies the update using the average. However, in practice, if mini-batch training is used, we observed that using only a single noise sample for each update can yield desirable results, since a new noise tensor is sampled for each mini-batch.

---
Algorithm 1 Clock's Perturbation Training Workflow
---

Input: D, y, f, ε, λ
Initialize M = 0, P = −∞ and $M_x > \frac{\Delta_f}{\varepsilon}$ repeat
    Sample E ~ Lap(0,1)
    Let $B = \frac{1.0 + \tanh(P)}{2}\left(M_x - \frac{\Delta_f}{\varepsilon}\right) + \frac{\Delta_f}{\varepsilon}$
    Let X = B o E + M
    Take gradient step on M and P from Equation (4)
until Algorithm converges
Return: M, B

---

The parameter λ is the knob, which could be tuned to reflect whether we want to trade-off accuracy for information degradation (more privacy), or vice versa. We name the −log B, the mutual information decay term. One important feature of Cloak is that it does not need access to sensitive information/labels. In other words, it does not need to be given specific information about what it is protecting against, it only needs access to the non-sensitive labels of the main task, and it tries to remove any extra information with the trained perturbations.

Cloak's optimization process can be seen in Algorithm 1. Before beginning the process, the locations tensor (M) is initialized to 0, and tensor P is initialized in such a way that the scales take the $$\left(\frac{\Delta_f}{\varepsilon}\right)$$

value. The rest of the parameters of the neural network are set to their pre-trained values. The functions $f$ and g are the target function and neural network function, as defined above.

Once the training is finished, the optimized locations and scales are saved. During deployment (inference), for each input that is supposed to be given to the inference service, a set of perturbations is sampled from the optimized distributions. Each element in the perturbations tensor X is sampled independently and added to input before it is uploaded for inference.

Proposition 1. Cloak is F-DP w.r.t. a single feature.

Proof. For a single feature $D_i$ in the dataset D, we have $A_f(D_i)=f(D_i)+X_i$, where $X_i$ is drawn from Lap($M_i$, $B_i$). This is a Laplace Mechanism and hence it is F-DP.

Proposition 2. Cloak is F-feature differentially private with respect to all features.

i is $\varepsilon_i$-DP for some $\varepsilon_i \geq 0$. Assume D and D' are two datasets that are different only on $j^{th}$ feature. Since Cloak samples each noise perturbation independently, we have $$P[A_f(D) = t] = \prod_i P[A_i(D_i) = t_i]$$

$$= P[A_j(D'_j) = t_j] \prod_{i \neq j} P[A_i(D'_i) = t_i]$$

$$\leq e^{\varepsilon_j} P[A_j(D'_j) = t_j] \prod_{i \neq j} P[A_i(D'_i) = t_i]$$

$$\leq e^{\max(\varepsilon_i)} P[A(D') = t].$$

Hence, Cloak is F-feature DP with respect to all features.

To evaluate Cloak, we use four real-world datasets on four DNNs. Namely, we use VGG-16 on CelebA, AlexNet on CIFAR-100, a modified version of VGG-16 model on UTK-Face, and LeNet-5 on MNIST.

We define a set of non-sensitive tasks as inference services over these datasets. Specifically, we use smile detection on CelebA, the 20 super-class classification on CIFAR-100, and gender detection on UTKFace. For MNIST, we use a classifier that detects if the input is greater than five. The pre-trained accuracy of the networks for smile detection, super-class classification, gender detection and greater than five detection are 91.8%, 55.7%, 87.87% and 99.29%. The accuracy numbers reported herein are all on a held-out test set, which has not been seen during training by the neural networks. For Cloak results, since the output is not deterministic, we repeatedly run the inference ten times on the test set with the batch size of one and report the mean accuracy. Since the standard deviation of the accuracy numbers is small (consistently less than 1.5%) the confidence bars are not visible on the graphs.

The input image sizes for CelebA, CIFAR-100, UTKFace and MNIST are 224×224×3, 32×32×3, 32×32×3, and 32×32, respectively. In addition, in our experiments, the inputs are all normalized to 1. In all of the experiments, we add the perturbations directly to the input image and create a noisy representation (similar to those in FIG. 1) which we then be given to the neural network. Therefore, the function $f$ defined above is the identity function and the sensitivity $\Delta_f$ is 1. The experiments are all carried out using Python 3.6 and PyTorch 1.3.1. We use Adam optimizer for perturbation training. The mutual information numbers reported herein are estimated over the test set using the Shannon Mutual Information estimator provided by the Python ITE toolbox.

FIGS. 10A-10D shows the mean accuracy loss for a given privacy budget ε. Two methods are compared here. First, the Basic—No Training method that we consider as the baseline in which perturbation elements (the noise for each pixel) are independently generated from a Laplace distribution with location of zero and scale of $$\frac{\Delta_f}{\varepsilon}.$$

$$\frac{\Delta_f}{\varepsilon}$$

is the minimum scale that the perturbation distributions can have, in order to achieve a certain privacy budget of F for the feature-differential privacy criterion described above.

For the second method, Cloak is used to observe the effect of perturbation distribution training on the accuracy. To do so we removed the mutual information term from Equation (4). The trainable parameters are only the locations and scales (tensors M and B) of perturbation distributions. This means that the number of trainable parameters are 2×input_feature_dimensions, and the rest of the neural network parameters are frozen.

We observe that the scales (B) of the perturbation elements do not change during training, since Cloak is only optimizing for accuracy and is not trying to decrease the mutual information. So, the scales remain at their $$\frac{\Delta_f}{\varepsilon}$$

value that delivers the F-feature differential privacy guarantee. This implies that the improvement over the No Training method is merely caused by the training of the elements of the locations tensor. The vertical arrows in the graphs indicate the amount of accuracy improvement achieved through the perturbation training. For a budgets e of less than 0.25, the amount of noise is so high that the perturbation training can only modestly mitigate the situation and all the methods yield similar results. FIGS. 10A-10D are depicted for F below 5, to zoom into the region of interest and show the details. FIGS. 13A-D show graphs with F of up to 10.

Figure 10A:
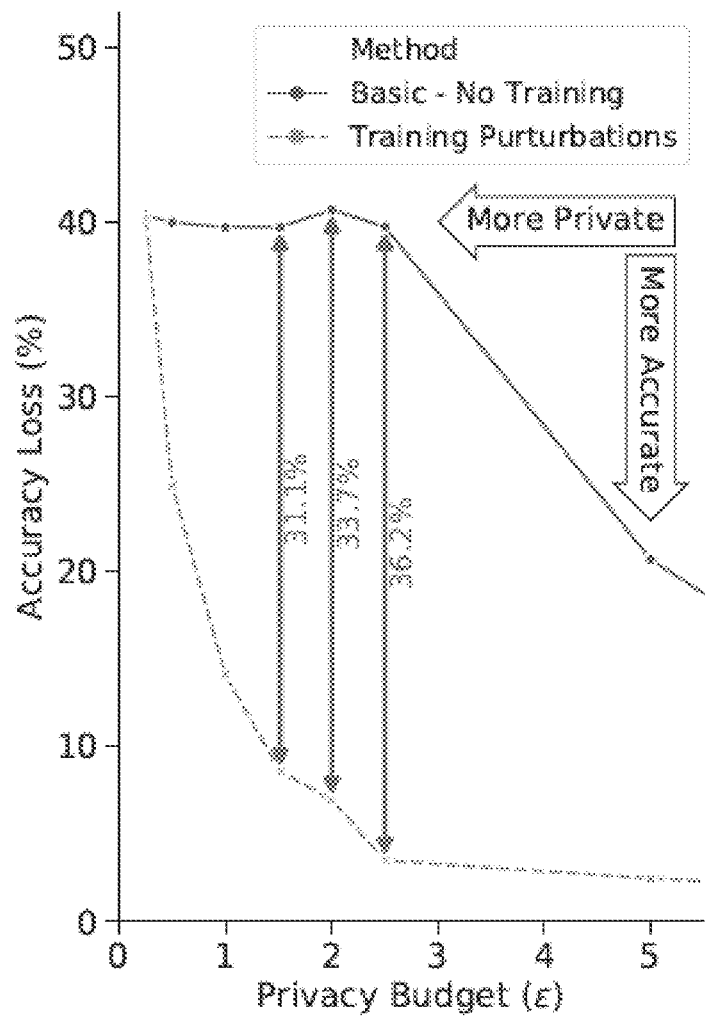
FIGS. 10A-10D illustrate accuracy loss vs. the privacy budget (F) for four benchmark datasets, measured on the test set of each of the four datasets.
Figure 10B:
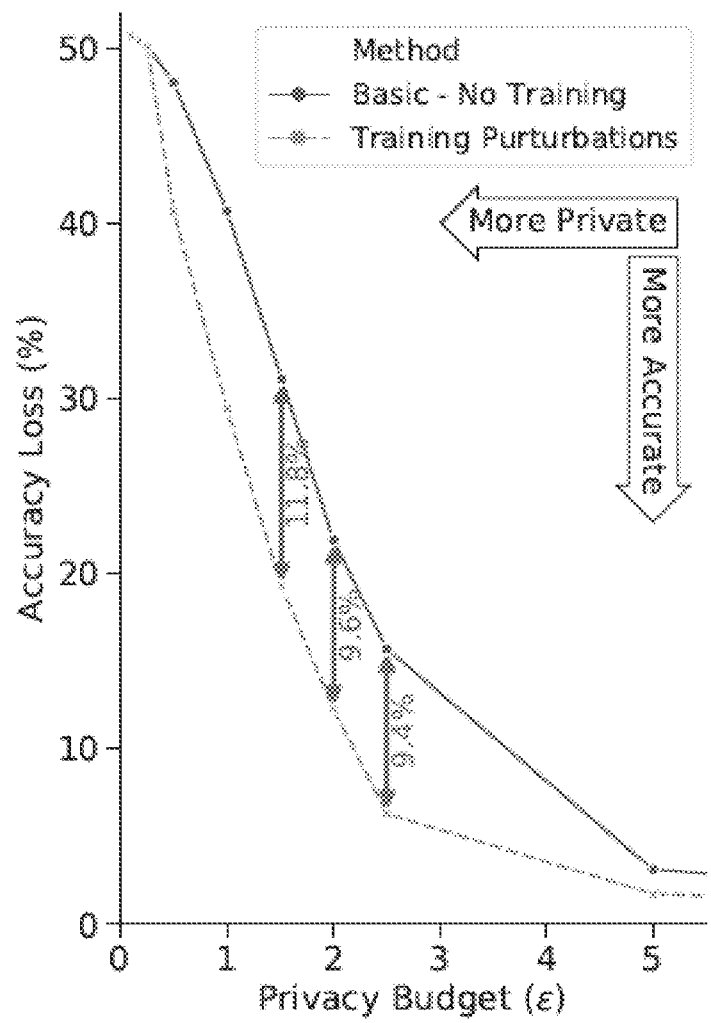
Figure 10C:
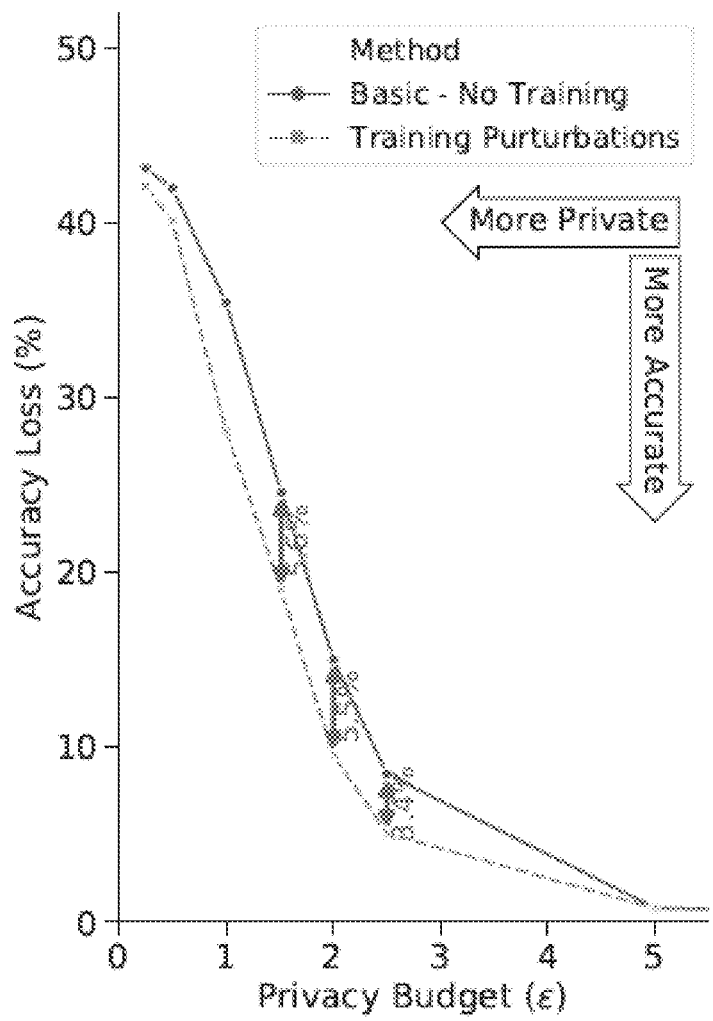
Figure 10D:
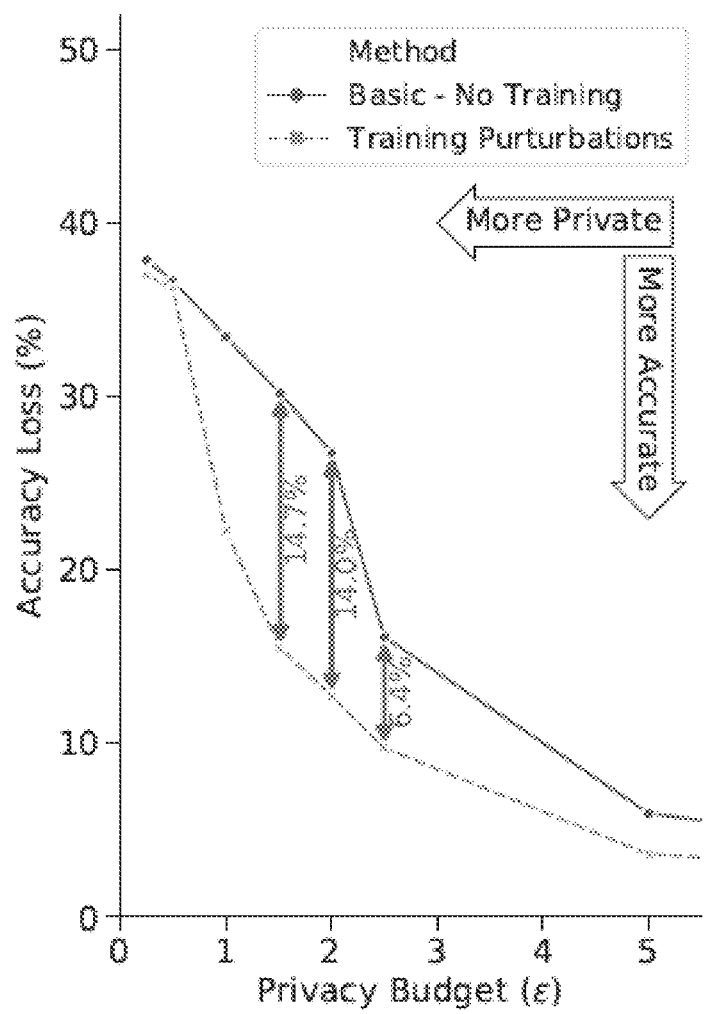

FIGS. 10A-10D illustrate accuracy loss vs. the privacy budget (F) for the four benchmark datasets, measured on the test set of each of the four datasets. The datasets are: CelebA (FIG. 10A), CIFAR-100 (FIG. 10B), MNIST (FIG. 10C), and UTKFace (FIG. 10D). Solid lines (labeled "Basic—No Training" in FIGS. 10A-D) represent example results obtained after adding random differentially-private perturbation. Lighter dashed lines (labeled "Training Purturbations" in FIGS. 10A-10D) show example effects of training the perturbation distribution parameters. The neural network parameters remain frozen at all times. The gaps between the solid and dashed lines shown with vertical arrows in FIGS. 10A-10D indicate the improvement in accuracy brought by perturbation training using an example embodiment of a method according to the technology disclosed in this patent document for a given ε.

Figure 11A:
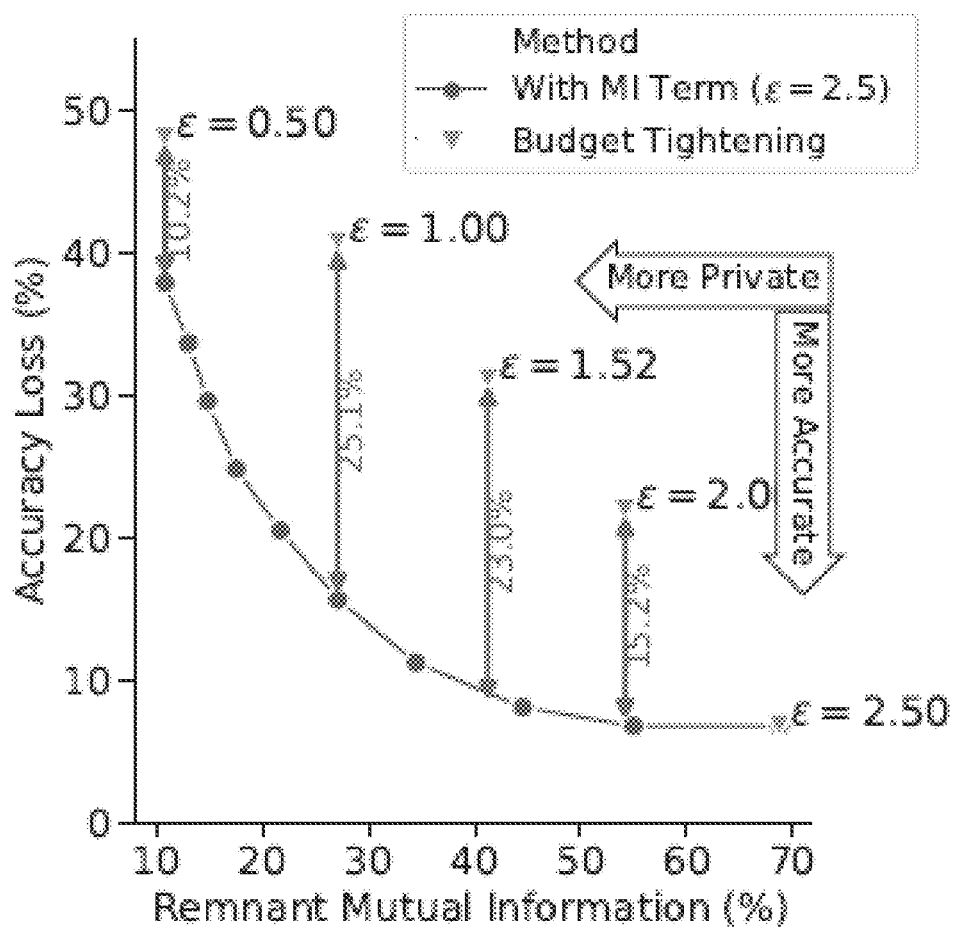
FIGS. 11A-11C illustrate accuracy loss vs. the remaining mutual information for a fixed differential-privacy budget of $\varepsilon=2.5$ for three benchmark datasets.
Figure 11B:
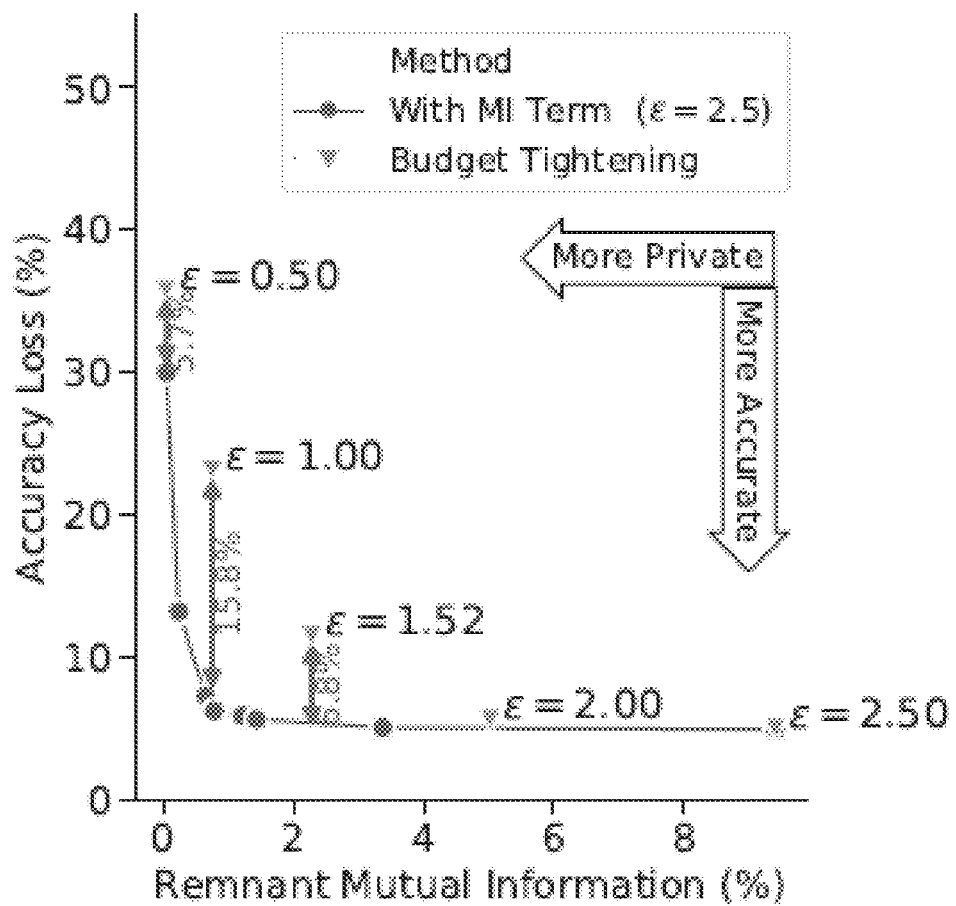
Figure 11C:
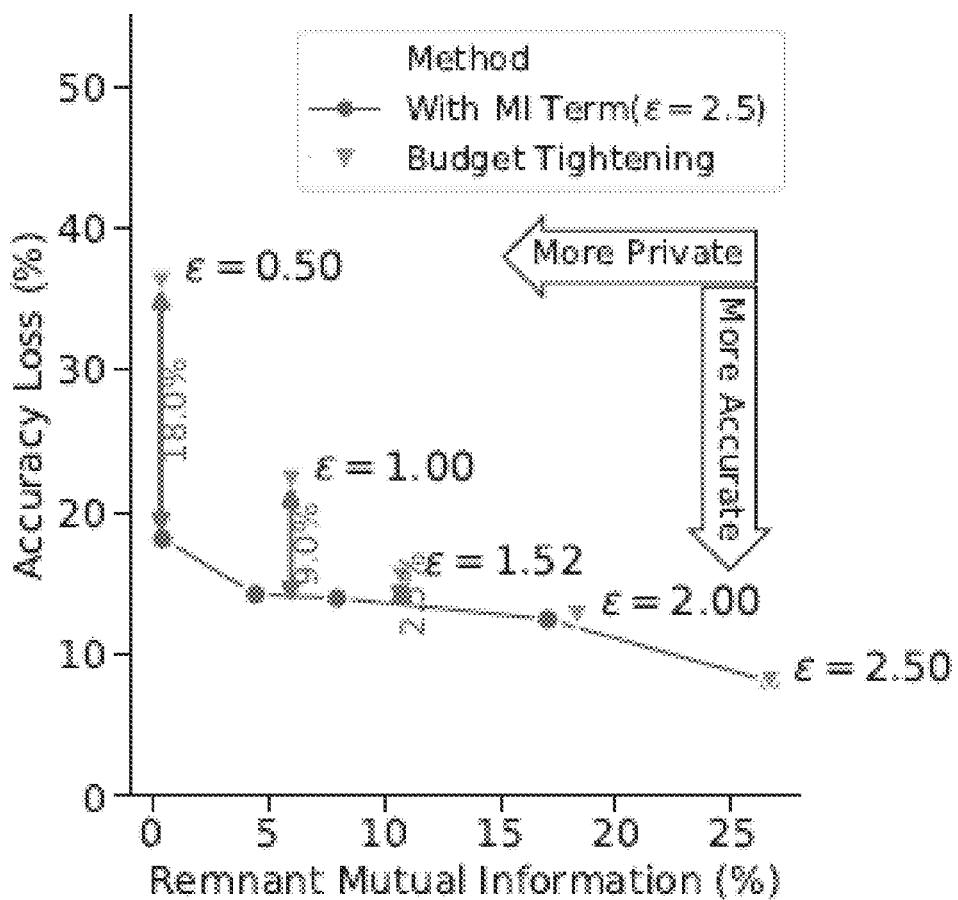

FIGS. 11A-11C shows the accuracy loss vs. the remnant mutual information in the original image. Remnant mutual information denotes the mutual information between the original image and its noisy representation, divided by the amount of information in bits in the original image. For the With MI Term method, the $\lambda$ in Equation (4) is tuned, so that as the accuracy grows, the mutual information in the original images would degrade. The privacy budget is ε=2.5 for all the points depicted for this method, since the mutual information degradation does not violate the differential privacy guarantee by pushing any scale below $$\frac{\Delta_f}{\varepsilon}.$$

The Budget Tightening method shows how much accuracy loss would be incurred, if the same level of mutual information is to be achieved through merely tightening the differential privacy guarantee, using Cloak without the MI term (−log (BM), similar to the training method of described above. The graphs show that using the MI term helps achieve a certain level of mutual information with less damage to model utility. The vertical arrows show the difference in utility (accuracy) for these two methods. The worse utility brought by naïvly tightening the differential privacy budget is because DP tries to make all the features in the image similar, and adds perturbations with the same scale to all the pixels.

For both cases, the graphs show a trade-off between accuracy and the loss in mutual information. For CIFAR-100, since the task is classifying the 20 superclasses, there is inherently more need for information for classification, compared to the other benchmarks. Therefore, for a given level of accuracy loss, the information content cannot be decreased as much as it can in the other benchmarks. We do not present any numerical results for the CelebA dataset here, since the input images have an extremely large number of features and the mutual information estimator tool is not capable of estimating the mutual information.

FIGS. 11A-11C illustrate accuracy loss vs. the remaining mutual information for a fixed differential-privacy budget of F=2.5 for three datasets: CIFAR-100 (FIG. 11A), MNIST (FIG. 11B), and UTKFace (FIG. 11C). Data points labeled by downward-directed triangles (labeled "The Budget Tightening" in FIGS. 11A-11C) show example results obtained using the "Budget Tightening" method. Corresponding values of F are indicated next to each "Budget Tightening" data point in FIGS. 11A-11C. As FIGS. 11A-11C illustrate, the "Budget Tightening" method degrades the accuracy more for a given remnant mutual information level compared to the "With MI Term" method. Example data obtained using the "With MI Term" method are shown in FIGS. 11A-11C by circles connected by a solid line (labeled "With MI Term" in FIGS. 11A-11C). The "With MI Term" method exploits the mutual information term in the loss to reach the desired mutual information level, without tightening the differential privacy guarantee by reducing F. The gaps between the "Budget Tightening" and "With MI Term" data points are shown by vertical arrows in FIGS. 11A-11C and indicate the differences in utility of these approaches for a given level of mutual information reduction.

To evaluate the obfuscation that Cloak provides, we devise an experiment in which a malevolent party tries to infer a sensitive private label from an input that is sent to an inference service. To this end, we use CelebA dataset and use gender as the sensitive label while the inference service is set to detect smiles from the perturbed inputs. Cloak does not access to the private labels while learning the perturbations, and it only optimizes for the accuracy of the smile detection task, and decreasing the mutual information.

Figure 12:
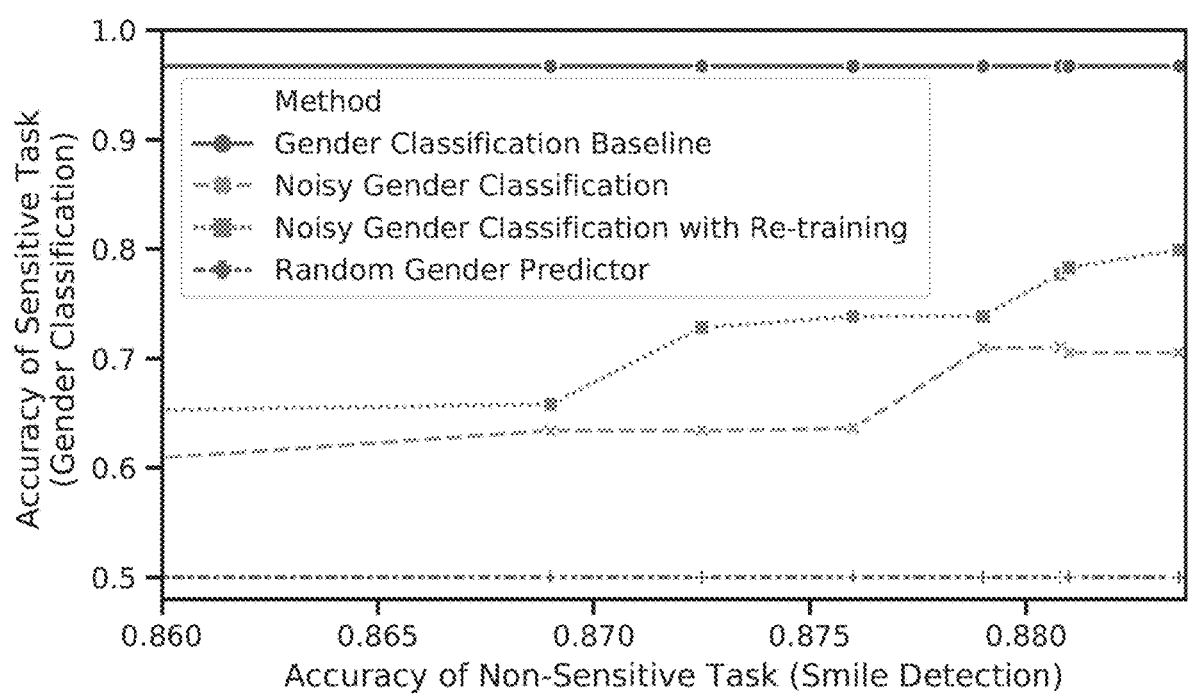
FIG. 12 illustrates that methods according to the technology disclosed in this patent document are protecting the user against malicious use of their private information.
Figure 13A:
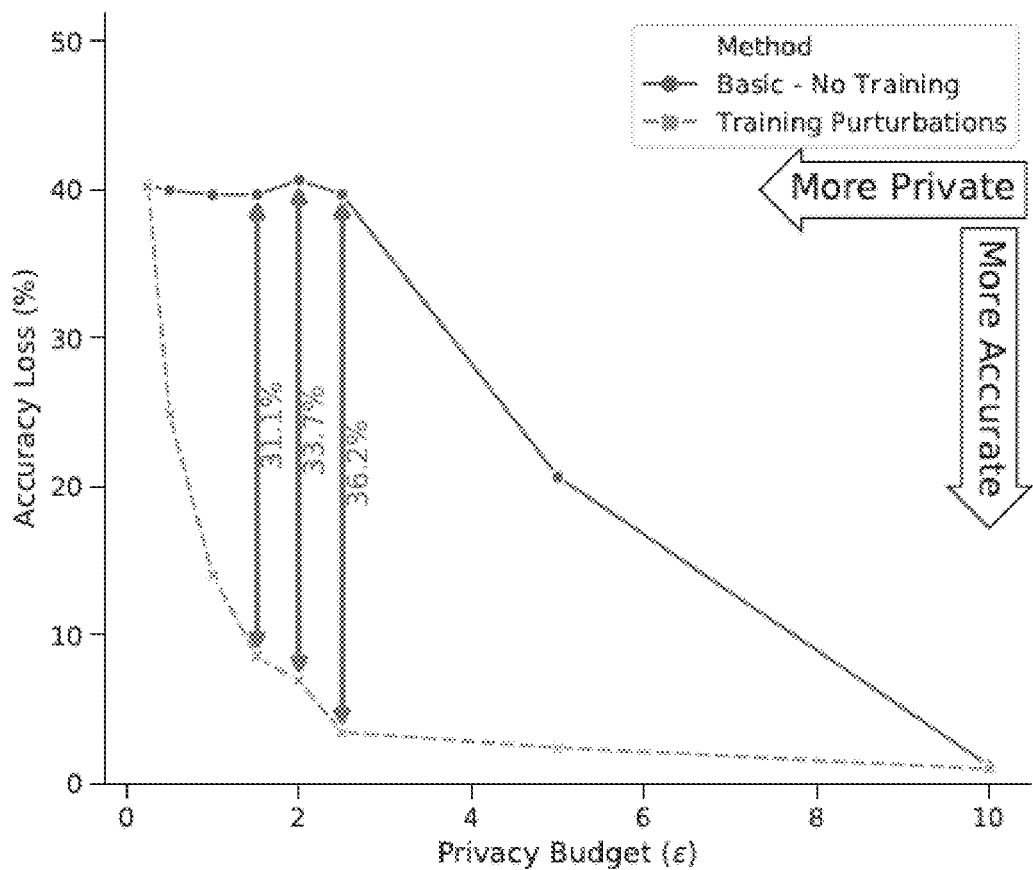
FIGS. 13A-13D illustrate accuracy loss vs. the privacy budget (F) for a privacy budget of up to 10 for the four benchmark datasets, measured on the test set of each of the four datasets.
Figure 13B:
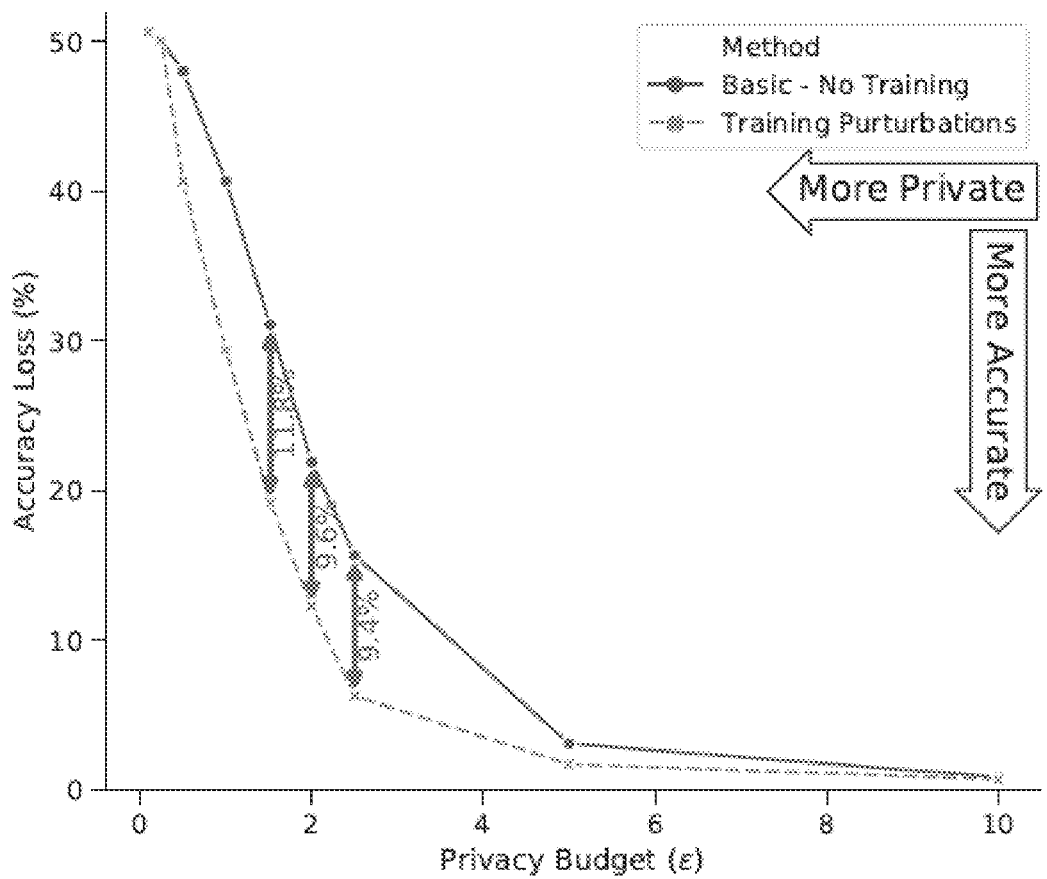
Figure 13C:
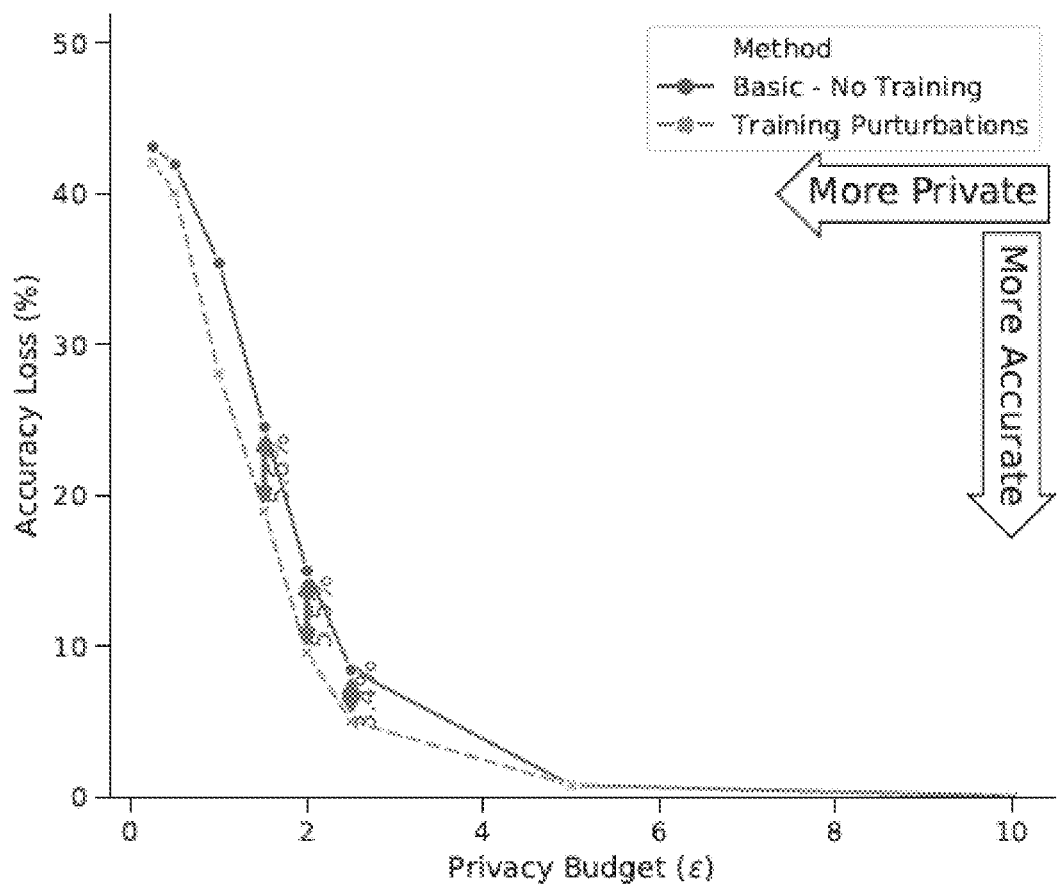
Figure 13D:
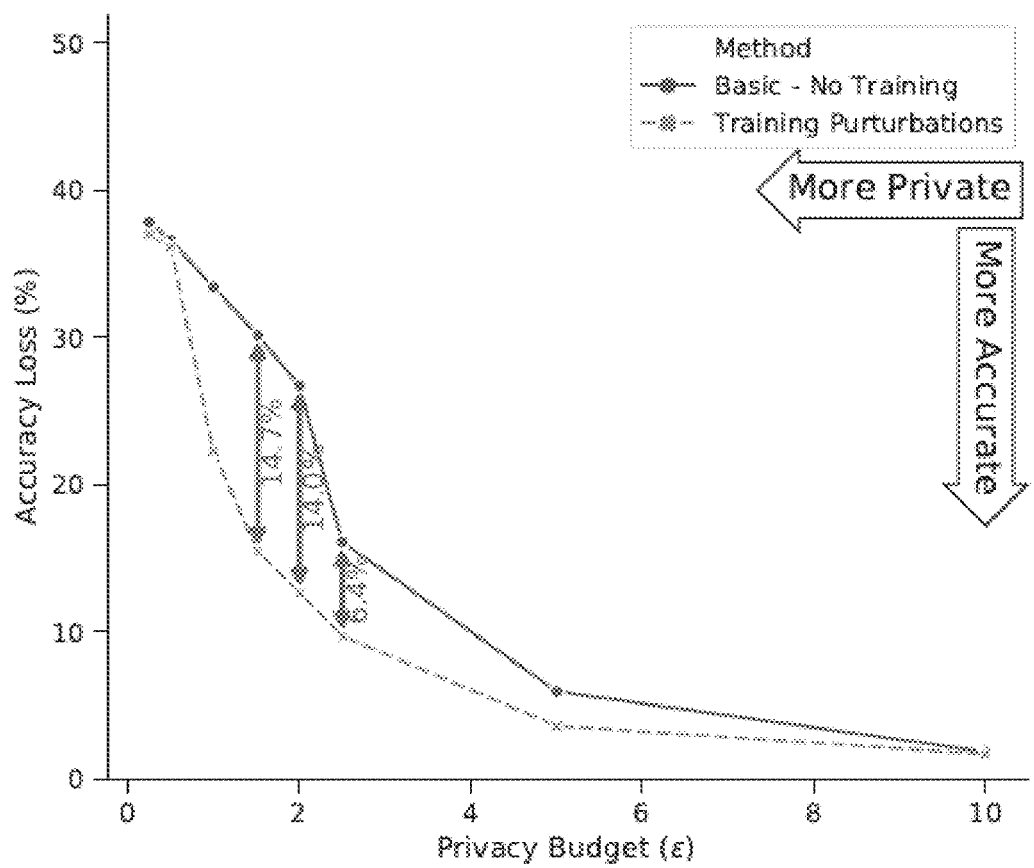

FIG. 12 shows the results of this experiment. The malevolent party is assumed to have a pre-trained VGG-16 neural network for gender classification, that has an accuracy of 96.7% on the test set, shown by the Gender Classification Baseline line. Cloak trains perturbation parameters with F=2.5, but with different levels of inter-element intensity, i.e., it uses mutual information term, similar to the ones depicted in FIG. 1. The Noisy Gender Classification depicts the accuracy achieved by the malevolent party's neural network, when it receives the perturbed representations (of the test set) and runs inference on them. The Noisy Gender Classification with Re-training depicts the same accuracy, but when the malevolent neural network is re-trained using the perturbed representations of the training dataset.

We first assume a malevolent party that would re-train its entire neural network (mark all parameters as trainable), but it would not learn anything. We then assume a malevolent party that would limit the training to the last fully connected layer, which yielded the results seen under the Noisy Gender Classification with Re-training. We believe the reason that limiting the number of parameters is helpful is that it limits the fluctuations in the network, by fixing a huge portion of the model parameters. The last line in the Figure is the accuracy that a random predictor would provide, which is 50%. For smile detection with accuracy of 86.9%, the gender classifier suffers an accuracy loss of 30.7% and does 15.8% better than a random classifier. The drop in gender classification accuracy, and the disability in learning and gaining higher accuracy is caused by the perturbation obfuscating unrelated features. However, since the nonsensitive task is smile detection, there could be some features that both gender detection and smile detection rely on (like the mouth area). This means it might not be possible to completely remove gender information while still maintaining smile detection accuracy.

FIG. 12 illustrates that an example method according to the disclosed technology learns perturbations for the inference service of smile detection on CelebA dataset with 4.9% degradation to the accuracy of this service. If a malevolent party attempts to use the same perturbed image to infer sensitive (private) information, e.g. gender, the performance of this new inference service will be degraded by at least 31% while originally the accuracy was 96.7%. This shows that methods according to the technology disclosed in this patent document are protecting the user against malicious use of their private information.

Consider a deterministic pre-processing function $f(D)$ that operates on the input tensor data D. We can model a DNN by a deterministic function $g(f(D);\theta^*)$, where, $f(D)$ is the tensor of pre-processed input data and $\theta^*$ is the fixed optimized parameter that fully determines the function g (and maximizes its utility over the distribution of the input tensor). We assume the DNN is trained and the parameter $\theta^*$ remains the same throughout the process. As such, for the ease of the notation, we might drop the parameter $\theta^*$.

Suppose $L_{nn}(D, g(f(D);\theta))$ is a loss function such that $$\theta^* \in \arg{}^{\min}_{\theta} L_{nn}(D,g(f(D);\theta))$$

If $L_{nn}$ is the loss function corresponding to the DNN, then we are assuming that the network is trained and $\theta^*$ is the optimal parameter.

We define the privacy P as the negative of the mutual information between the input of the function g and the raw data D, i.e., $$P=-I(D;f(D))$$

where $I(\cdot;\cdot)$ represents mutual information. The lower mutual information implies higher privacy. Since $f$ is a deterministic function, we have $$P=-H(f(D))+H(f(D)|D)=-H(f(D)) \quad (6)$$

where $H(\cdot)$ denotes the entropy function.

Denote a perturbation tensor by X which is independent of D. We intend to perturb the input to function g by changing $f(D)$ to $f(D)+X$, i.e., the output of function g changes from $g(f(D);\theta^*)$ to $g(f(D)+X;\theta^*)$. It is worth reemphasizing that the parameter $\theta^*$ remains unchanged. Now, we need to change the privacy measure P to $\hat{P}$ where $\hat{P}=-I(D;g(f(D)+X))$. We can provide the following lower bound $$\hat{P} = -I(D; f(D)+X) \quad (7)$$
$$\geq -I(f(D); f(D)+X)$$
$$= -H(f(D))+H(f(D)|f(D)+X)$$
$$= P + H(f(D)|f(D)+X)$$

where the last equality is derived from (6). This equation implies that by noise injection process, we can improve the privacy at least by $H(f(D)|f(D)+X)$.

After noise injection, we would like to find the optimal perturbation X* that maximizes the privacy while keeping the performance at an admissible error range. In other words, we are looking for the solution to the following optimization problem $$X^* = \arg\max_X \hat{P} \text{ s.t. } L_{nn}(D, g(f(D)+X;\theta^*)) \leq \gamma$$

Given (7), we use $I(f(D);f(D)+X)=H(f(D)+X)-H(f(D)+X|f(D))=H(f(D)+X)-H(X)$ as a surrogate objective and reformulate the problem in terms of a Lagrange multiplier $\lambda$ as $$X^* = \arg\min_X H(f(D)+X) - H(X) + \lambda L_{nn}(D, g(f(D)+X;\theta^*)) \quad (8)$$

where the dual parameter $\lambda$ is to be determined via cross validation on the generalization error.

Optimization problem (8) has three terms. The first term controls the amount of information that leaks to the remote part of the DNN and we want to minimize this information. The second term controls the amount of uncertainty that we are injecting in the form of iid noise. This term is typically proportional to the variance of the noise and we want this term to be maximized (and hence the negative sign). The last term controls the amount of degradation in the performance of the DNN and we want to minimize that with respect to the knob $\lambda$.

The loss function $L_{nn}(\cdot)$ is determined at the training time of the DNN to obtain the optimal parameter $\theta^*$. The loss function for a regression problem can be a Lebesgue $L_p$-norm and for a q-class classification problem with $Z=g(f(D)+X;\theta^*)$, it can be $$L_{nn}(D, Z) = -\sum_{j=1}^{q} 1_{X \in C_j} \log(Z_j)$$

where 1. is the indicator function, $C_j$ represents the $j^{th}$ class and $Z_j$ is the $j^{th}$ logit representing the probability that $D \in C_j$. Suppose 1D is a one-hot-encoded q-vector with $j^{th}$ element being 1 if $D \in C_j$ and the rest are zero. We then can write the classification loss in vector form as $L_{nn}(D,Z)-1_X^T \log(Z)$. For the remainder of this paper, we target a q-class classification and rewrite (8) as $$X^* = \arg\min_X H(f(D)+X) - H(X) + \lambda 1_X^T \log(g(f(D)+X;\theta^*)) \quad (9)$$

X is element-wise distributed as Lap(M,B), we can establish that the first and second term in (9) are proportional to log (B) and rewrite the optimization problem as $$(M^*, B^*) = \arg\min_{M,B} -\log(B) + \lambda E_{X \sim Lap(M,B)}[1_X^T \log(g(f(D)+X;\theta^*))] \quad (10)$$

where $E[\cdot]$ represents the expectation that can be approximated via Monte Carlo sampling of X. Solving this optimization problem, we get the optimal noise distribution parameters.

In order to do the inference, we generate a noise tensor X drawn from the distribution we learned in (10), and add it to the output of function $f$ before sending it to the server.

The optimization problem (10) guarantees that for a given value of the knob λ, one can find the distribution parameters that minimizes the information sent to the cloud, while preserving the quality of the service. Since this optimization problem is convex, we are guaranteed to converge to the optimal point via gradient descent algorithm. That is why Cloak uses this optimization technique.

TABLE 1

Neural networks used in experiments described above.

| Neural Network | Conv Layers | FC Layers | Dataset |
|---|---|---|---|
| VGG-16 | 13 | 3 | CelebA |
| AlexNet | 5 | 3 | CIFAR-100 |
| LeNet-5 | 13 | 3 | MNIST |
| VGG-16 (modified) | 3 | 2 | UTKFace |

We have run the experiments for CelebA and CIFAR-100 datasets on an Nvidia RTX 2080 Ti GPU, with 11 GB VRAM, paired with 10 Intel Core i9-9820X processors with 64 GBs of memory. The experiments for MNIST and UTKFace datasets were run on the CPU. The systems runs an Ubuntu 18.04 OS, with CUDA version V 10.2.89.

Table 1 shows the DNNs used for the experiments. The modified VGG-16 is different from the conventional one in the size of the last 3 fully connected layers. They are (512,256), (256,256) and (256,2).

As mentioned above, the mutual information between the input images and their noisy representations are estimated over the test set images using ITE toolbox's Shannon mutual information estimator. For MNIST images, our dataset had inputs of size 32×32 pixels, which we flattened to 1024 element vectors, for estimating the mutual information. For other datasets, since the images were larger (32×32×3), there were more dimensions and mutual information estimation was not accurate. So, what we did here was calculate mutual information channel by channel (i.e., we estimated the mutual information between the red channel of the image and its noisy representation, then the green channel and then blue), and we averaged over all channels.

Tables 2, 4 and 3 show the hyperparameters used for training in the experiments of described above. For the last two, the Point # indicates the experiment that produced the given point in the graph, if the points were numbered from left to right. In our implementation, for ease of use and without loss of generality, we have introduced a variable γ to the loss function in Equation (4), in a way that $$\gamma = \frac{1}{\lambda},$$

and it is the coefficient of the mutual information term, not the cross-entropy loss. With this introduction, we do not directly assign a λ (as if λ were removed and replaced by γ as a coefficient of the other term) and we need not set λ very high when we want to remove the mutual information term. We just set γ to zero. In the tables, we have used lambda to be consistent, and in the cells were the number for λ is not given, it means that the mutual information term was not used. But in the Code, the coefficient is set on the other term and is 1/λ s reported here. The batch sizes used for training are 128 for CIFAR-100, MNIST and UTKFace and 40 for CelebA. For testing, as mentioned in the text above, the batch size is 1, so as to sample a new noise tensor for each image and capture the stochasticity. Also, the number of samples taken for each update in optimization is 1, as mentioned above, since we do mini-batch training and for each mini-batch we take a new sample. Finally, $M_x$ is set to 2.0 for all benchmarks, except for MNIST where it is set to be 1.5.

FIGS. 13A-13D re-illustrate FIGS. 10A-10D, respectively, with a wider privacy budget of up to 10. It can be seen in FIGS. 13A-13D that for most benchmarks, for privacy budgets larger than 5, since the amount of injected noise is less, the accuracy loss is less and the training the perturbation parameters makes a smaller improvement.

TABLE 2

Hyperparameters for experiments illustrated in FIGS. 10A-10D.

| Dataset | Epsilon | Details |
|---|---|---|
| CelebA | 10.00 | 0.3 epoch w/lr = 0.0001 |
| | 5.00 | 0.3 epoch w/lr = 0.01, 0.3 epoch w/lr = 0.0001 |
| | 2.50 | 0.3 epoch w/lr = 0.01, 0.3 epoch w/lr = 0.0001 |
| | 2.00 | 1 epoch w/lr = 0.01, 1 epoch w/lr = 0.00001 |
| | 1.52 | 1 epoch w/lr = 0.01, 1 epoch w/lr = 0.00001 |
| | 1.00 | 1 epoch w/lr = 0.01, 0.5 epoch w/lr = 0.00001 |
| | 0.50 | 1 epoch w/lr = 0.01, 0.5 epoch w/lr = 0.00001 |
| | 0.25 | 1 epoch w/lr = 0.01, 0.5 epoch w/lr = 0.00001 |
| CIFAR-100 | 10.00 | 1 epoch w/lr = 0.00001 |
| | 5.00 | 1 epoch w/lr = 0.01, 2 epoch w/lr = 0.001, 3 epoch w/lr = 0.00001 |
| | 2.50 | 9 epoch w/lr = 0.01, 6 epoch w/lr = 0.001, 3 epoch w/lr = 0.0001 |
| | 2.00 | 20 epoch w/lr = 0.000001 |
| | 1.52 | 20 epoch w/lr = 0.000001 |
| | 1.00 | 20 epoch w/lr = 0.000001 |
| | 0.50 | 20 epoch w/lr = 0.000001 |
| | 0.25 | 20 epoch w/lr = 0.000001 |
| MNIST | 10.00 | 20 epoch w/lr = 0.001 |
| | 5.00 | 20 epoch w/lr = 0.001 |
| | 2.50 | 30 epoch w/lr = 0.001, 25 w/lr = 0.0001 |
| | 2.00 | 20 epoch w/lr = 0.001, 32 w/lr = 0.0001 |
| | 1.52 | 30 epoch w/lr = 0.001, 25 w/lr = 0.0001 |
| | 1.00 | 30 epoch w/lr = 0.001, 25 w/lr = 0.0001 |
| | 0.50 | 10 epoch w/lr = 0.00001 |
| | 0.25 | 10 epoch w/lr = 0.00001 |
| UTKFace | 10.00 | 1 epoch w/lr = 0.01, 5 epoch w/lr = 0.0001 |
| | 5.00 | 1 epoch w/lr = 0.01, 5 epoch w/lr = 0.0001 |
| | 2.50 | 1 epoch w/lr = 0.01, 8 epoch w/lr = 0.0001 |
| | 2.00 | 6 epoch w/lr = 0.01, 6 epoch w/lr = 0.0001 |
| | 1.52 | 6 epoch w/lr = 0.01, 6 epoch w/lr = 0.0001 |
| | 1.00 | 6 epoch w/lr = 0.01, 6 epoch w/lr = 0.0001 |
| | 0.50 | 12 epoch w/lr = 0.01, 6 epoch w/lr = 0.0001 |
| | 0.25 | 12 epoch w/lr = 0.01, 6 epoch w/lr = 0.0001 |

TABLE 3

Hyperparameters for experiments illustrated in FIG. 12.

| Task | Point# | Details |
|---|---|---|
| Gender Classification | 1 | 1 epoch w/lr = 0.0001 |
| | 2 | 1 epoch w/lr = 0.01, 2 epoch w/lr = 0.0001 |
| | 3 | 1 epoch w/lr = 0.01, 2 epoch w/lr = 0.0001, 1 epoch w/lr = 0.00001 |
| | 4 | 1 epoch w/lr = 0.01, 2 epoch w/lr = 0.0001, 1 epoch w/lr = 0.00001 |
| | 5 | 1 epoch w/lr = 0.01, 2 epoch w/lr = 0.0001, 1 epoch w/lr = 0.00001 |
| | 6 | 1 epoch w/lr = 0.01, 2 epoch w/lr = 0.0001, 3 epoch w/lr = 0.00001 |
| | 7 | 1 epoch w/lr = 0.01, 2 epoch w/lr = 0.0001, 2 epoch w/lr = 0.00001 |
| | 8 | 1 epoch w/lr = 0.01, 2 epoch w/lr = 0.0001, 3 epoch w/lr = 0.00001 |
| Smile Detection | 1 | 1 epoch w/lr = 0.01, 0.1 epoch w/lr = 0.001 |
| | 2 | 0.5 epoch w/lr = 0.01 lambda = 1, 0.2 epoch w/lr = 0.001 lambda = 1 |

TABLE 3-continued

Hyperparameters for experiments illustrated in FIG. 12.

| Task | Point# | Details |
|---|---|---|
| | 3 | 0.5 epoch w/lr = 0.01 lambda = 1, 0.4 epoch w/lr = 0.001 lambda = 1 |
| | 4 | 0.5 epoch w/lr = 0.01 lambda = 1, 0.5 epoch w/lr = 0.001 lambda = 1 |
| | 5 | 0.5 epoch w/lr = 0.01 lambda = 1, 0.7 epoch w/lr = 0.001 lambda = 1 |
| | 6 | 0.5 epoch w/lr = 0.01 lambda = 1, 0.8 epoch w/lr = 0.001 lambda = 1 |
| | 7 | 0.5 epoch w/lr = 0.01 lambda = 1, 0.8 epoch w/lr = 0.001 lambda = 1, 0.2 epoch w/lr = 0.001 lambda = 5 |
| | 8 | 0.5 epoch w/lr = 0.01 lambda = 1, 0.8 epoch w/lr = 0.001 lambda = 1, 0.2 epoch w/lr = 0.001 lambda = 100 |

TABLE 4

Hyperparameters for experiments illustrated in FIGS. 11A-11C.

| Dataset | Point# | Details |
|---|---|---|
| CIFAR-100 | 1 | 6 epoch w/lr = 0.001 6, 14 epoch w/lr = 0.00001 |
| | 2 | 10 epoch w/lr = 0.001 lambda = 1, 2 epoch w/lr = 0.001 lambda = 10 |
| | 3 | 10 epoch w/lr = 0.001 lambda = 1, 2 epoch w/lr = 0.001 lambda = 10 |
| | 4 | 12 epoch w/lr = 0.001 lambda = 1, 2 epoch w/lr = 0.001 lambda = 10 |
| | 5 | 17 epoch w/lr = 0.001 lambda = 1, 3 epoch w/lr = 0.001 lambda = 10 |
| | 6 | 24 epoch w/lr = 0.001 lambda = 1, 2 epoch w/lr = 0.001 lambda = 10 |
| | 7 | 30 epoch w/lr = 0.001 lambda = 1, 2 epoch w/lr = 0.001 lambda = 10 |
| | 8 | 40 epoch w/lr = 0.001 lambda = 0.2, 2 epoch w/lr = 0.001 lambda = 10 |
| | 9 | 140 epoch w/lr = 0.001 lambda = 0.2, 2 epoch w/lr = 0.001 lambda = 10 |
| | 10 | 300 epoch w/lr = 0.001 lambda = 0.01, 20 epoch w/lr = 0.0001 lambda = 10 |
| MNIST | 1 | 25 epoch w/lr = 0.001, 30 epoch w/lr = 0.0001 |
| | 2 | 50 epoch w/lr = 0.01 lambda = 100, 40 epoch w/lr = 0.001 lambda = 1000 |
| | 3 | 50 epoch w/lr = 0.01 lambda = 100, 50 epoch w/lr = 0.001 lambda = 1000 |
| | 4 | 50 epoch w/lr = 0.01 lambda = 100, 60 epoch w/lr = 0.001 lambda = 200 |
| | 5 | 50 epoch w/lr = 0.01 lambda = 100, 90 epoch w/lr = 0.001 lambda = 200 |
| | 6 | 50 epoch w/lr = 0.01 lambda = 100, 160 epoch w/lr = 0.001 lambda = 200 |
| | 7 | 50 epoch w/lr = 0.01 lambda = 100, 180 epoch w/lr = 0.001 lambda = 200 |
| | 8 | 50 epoch w/lr = 0.01 lambda = 100, 260 epoch w/lr = 0.001 lambda = 100 |
| | 9 | 50 epoch w/lr = 0.01 lambda = 100, 290 epoch w/lr = 0.001 lambda = 100 |
| | 10 | 50 epoch w/lr = 0.01 lambda = 100, 300 epoch w/lr = 0.001 lambda = 100 |
| UTKFace | 1 | 6 epoch w/lr = 0.01, 6 epoch w/lr = 0.0001 |
| | 2 | 4 epoch w/lr = 0.01 lambda = 0.1, 2 epoch w/lr = 0.0001 lambda = 100 |
| | 3 | 8 epoch w/lr = 0.01 lambda = 0.1, 2 epoch w/lr = 0.0001 lambda = 100 |
| | 4 | 10 epoch w/lr = 0.01 lambda = 0.1, 2 epoch w/lr = 0.0001 lambda = 100 |
| | 5 | 12 epoch w/lr = 0.01 lambda = 0.1, 2 epoch w/lr = 0.0001 lambda = 100 |

One aspect of the disclosed embodiments relates to a method of providing data privacy that includes specifying a value of a parameter $\lambda$ related to trade-off between an accuracy of inference done by a neural network (NN) on a perturbed input of the NN and a degree of mutual information degradation between a raw input of the NN and the perturbed input of the NN; for each feature of a data instance, providing a Laplace distribution corresponding to the feature, wherein the Laplace distribution has parameters of location M and scale B; forming a tensor of locations $M_T$ and a tensor of scales $B_T$ using the parameters of the Laplace distributions provided for the features of the data instance; providing a loss function L having a term proportional to log(B), wherein tensor B is related to the tensor of scales $B_T$, and a term proportional to a product of the value of the parameter $\lambda$ and a utility loss function Lnn of the neural network, wherein the utility loss function Lnn can be used to train the neural network to perform an inference task T; finding optimized elements of $B_T$ and $M_T$ by optimizing, using the loss function L, accuracy of the inference task T performed by the neural network; for each feature of the data instance, determining values of optimized parameters of location M and scale B of the Laplace distribution corresponding to the feature using the optimized elements of $B_T$ and $M_T$.

In some example embodiments of the method of providing data privacy, the method further includes selecting, for each feature of an input data instance D of the neural network, a perturbation value x from the Laplace distribution corresponding to the feature and adding the perturbation value x to a value of the feature to produce a perturbed input data instance $D_P$; and sending the $D_P$ to the NN for inference. In other example embodiments of the method of providing data privacy, the neural network is pre-trained to perform an inference task. According to some example embodiments, the neural network is pre-trained to perform the inference task using the utility loss function Lnn. In certain example embodiments, the input data instance D is obtained by pre-processing a raw input $D_R$. In some example embodiments, the pre-processing is a normalization. In some example embodiments, the method of providing data privacy further includes specifying a value of a differential privacy budget F as a constraint. According to some example embodiments, the data instance is an image. In certain example embodiments, the feature of the data instance is a pixel of the image. In some example embodiments, sending the $D_P$ to the NN for inference comprising sending the $D_P$ over a network.

Another aspect of the disclosed embodiments relates to a method of providing data privacy for neural network computations that includes: for a given privacy budget F and for a target inference task to be performed by a neural network, finding optimized parameters of a set of statistical distributions which optimize performance of the neural network on the inference task and with respect to the privacy budget F using a loss function L, wherein the loss function L has a term related to a tensor, wherein the tensor is related to a parameter of at least one distribution from the set of statistical distributions and another term related to a utility loss function Lnn of the neural network for the target inference task; selecting, for each feature of an input, a perturbation value drawn from a distribution in the set of statistical distributions which has the optimized parameters and adding the perturbation value to a value associated with the feature to obtain a perturbed input; sending the perturbed input to the neural network; and performing the target inference task by the neural network on the perturbed input.

In some example embodiments of the method of providing data privacy for neural network computations, the term related to the tensor includes a logarithm of the tensor. In other example embodiments, the statistical distributions in the set of statistical distributions are of a same type. According to certain example embodiments, the statistical distributions in the set of statistical distributions are Laplace distributions. In some example embodiments, the parameter of at least one distribution is a scale of the at least one distribution. According to certain example embodiments of the method of providing data privacy for neural network computations, elements of the tensor are scales of the statistical distributions. In some example embodiments, sending the perturbed input to the neural network comprises sending the perturbed input over a communication network.

Yet another aspect of the disclosed embodiments relates to a data processing method that includes determining parameters of a distortion operation by which a source data is converted into a distorted data; and performing a data processing task on the distorted data.

In some example embodiments of the data processing method, the data processing task satisfies an F-differential privacy criterion when applied to the distorted data. In other example embodiments, the parameters are determined using a pre-trained neural network as an analytical function of the parameters. According to certain example embodiments, the parameters are determined using a gradient-based optimization of the analytical function of the parameters. According to some example embodiments, weights of the neural network do not change their values. In some example embodiments, the data processing method further includes refraining from specifying privacy of which data features needs to be protected. In some example embodiments, the distortion operation reduces mutual information between the source data and the distorted data. According to certain example embodiments, the distortion operation incurs a limited degradation to an accuracy of the data processing task due to the distortion operation. In some example embodiments, the data processing task includes an inference task performed by a neural network. In other example embodiments, the parameters are parameters of a set of statistical distributions. In some example embodiments, the data processing method further includes transferring the distorted data over an external network to a remote server. According to some example embodiments, the external network is a communications network.

An aspect of the disclosed embodiments relates to a method of providing privacy for data that includes injecting stochasticity into the data to produce perturbed data, wherein the injected stochasticity satisfies an F-differential privacy criterion, and transmitting the perturbed data to a neural network or to a partition of the neural network for inference.

In some example embodiments, the neural network is a deep neural network. According to certain example embodiments, the neural network is a pre-trained neural network. According to some example embodiments, the amount of stochasticity is such that information content of the perturbed data retains essential pieces that enable the inference to be serviced accurately by the neural network. In some example embodiments, the amount of stochasticity is determined by discovering the stochasticity via an offline gradient-based optimization that reformulates the neural network as an analytical function of the stochasticity. In certain example embodiments, weights of the neural network do not change their values.

Another aspect of the disclosed embodiments relates to a method of providing privacy for data that includes determining, for a pre-trained deep neural network (DNN), an amount of stochastic perturbation, applying the amount of the stochastic perturbation to source data to obtain perturbed source data, and transmitting the perturbed source data to the DNN or to a partition of the DNN.

In some example embodiments, the amount of stochastic perturbation is such that information content of the perturbed source data retains essential pieces that enable an inference request to be serviced accurately by the DNN. In certain example embodiments, the amount of stochastic perturbation is determined by discovering the stochasticity via an offline gradient-based optimization problem that reformulates the pre-trained DNN as an analytical function of the stochastic perturbation. According to some example embodiments, weights of the pre-trained DNN do not change their values.

Yet another aspect of the disclosed embodiments relates to a method of providing privacy for data that includes determining an amount of stochastic perturbation in a source data without accessing sensitive information or labels associated with the source data, and transmitting, to a neural network or to a partition of the neural network, a perturbed data obtained by perturbing the source data using the amount of stochastic perturbation.

In some example embodiments, the neural network is a deep neural network. In certain example embodiments, the neural network is a pre-trained neural network. According to some example embodiments, the amount of stochastic perturbation is such that information content of the perturbed data retains essential pieces that enable an inference request to be serviced accurately by the neural network. In some example embodiments, the amount of stochastic perturbation is determined by discovering the stochasticity via an offline gradient-based optimization problem that reformulates the neural network as an analytical function of the stochastic perturbation. In certain example embodiments, weights of the neural network do not change their values.

In some example embodiments of a method of providing privacy for data according to the disclosed technology, the neural network resides on a device which performs the method. In other example embodiments of a method of providing privacy for data according to the disclosed technology, the neural network resides on a device other than the device which performs the method. According to some example embodiments of a method of providing privacy for data according to the disclosed technology, the neural network is a distributed neural network. According to certain example embodiments of a method of providing privacy for data according to the disclosed technology, a part of the neural network resides on a device which performs the method and another part of the neural network resides on a device other than the device which performs the method.

An aspect of the disclosed embodiments relates to a communication apparatus that includes a memory and a processor, wherein the processor is configured to read code from the memory and implement a method according to the technology disclosed in this patent document.

Another aspect of the disclosed embodiments relates to a non-transitory computer-readable medium storing instructions that, when executed by a computer, cause the computer to perform a method according to the technology disclosed in this patent document.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of data obfuscation, comprising:
   determining, with a computer system, for a neural network, parameters of a distortion operation, wherein the parameters of the distortion operation are determined based on an objective function, wherein:
   the distortion operation operates on an input dataset of the neural network to produce an obfuscated input dataset, and
   the parameters of the distortion operation are determined by:
   determining a measure of privacy for obfuscated input data based on the neural network;
   determining a measure of performance degradation for the neural network based on the obfuscated input data; and
   adjusting the parameters according to the objective function to modulate the measure of privacy in a first direction that indicates an increase in privacy and modulate the measure of performance degradation in a second direction that indicates a decrease in performance degradation.

2. The method of data obfuscation of claim 1, wherein:
   determining the parameters based on the objective function comprises determining the parameters based on a gradient-based optimization of the objective function;
   the input dataset is not made available to the neural network in unobfuscated form;
   the obfuscated input dataset is data to be input to the neural network;

a response of the neural network to the obfuscated input dataset is substantially accurate without revealing all of information in the input dataset to the neural network; and the neural network is previously trained.

3. The method of data obfuscation of claim 1, further comprising steps for optimizing the objective function by adjusting the parameters based on a privacy budget.

4. The method of data obfuscation of claim 1, wherein the neural network is a pre-trained neural network.

5. The method of data obfuscation of claim 1, further comprising:
providing the obfuscated input dataset to the neural network and inferring an output of the neural network based on the obfuscated input dataset.

6. The method of data obfuscation of claim 5, further comprising:
obtaining the input dataset;
obfuscating the input dataset based on the parameters of the distortion operation; and
generating an inference, by the neural network, based on the obfuscated input dataset.

7. The method of data obfuscation of claim 1, further comprising:
obtaining the input dataset by a first device;
performing the distortion operation on the input dataset to produce an obfuscated dataset at the first device; and
transmitting the obfuscated input dataset to the neural network or a partition of the neural network.

8. The method of data obfuscation of claim 7, wherein the first device is a user device and wherein neural network of the partition of the neural network resides in a cloud.

9. The method of data obfuscation of claim 1, wherein the distortion operation comprises adding noise from a perturbation distribution to the input dataset and wherein the parameters of the distortion operation are parameters of the perturbation distribution.

10. The method of data obfuscation of claim 9, wherein the parameters of the perturbation distribution comprise location values and scale values.

11. The method of data obfuscation of claim 10, wherein the input dataset comprises a tensor, wherein the parameters of the perturbation distribution comprise at tensor of location values and a tensor of scale values, and wherein the tensor of location values and the tensor of scale values have dimensions substantially similar to the input dataset.

12. The method of data obfuscation of claim 10, wherein the scale values are larger than a global sensitivity corresponding to the neural network divided by a privacy budget.

13. The method of data obfuscation of claim 12, wherein global sensitivity is determined based on a maximum difference between output of the neural network for a first input dataset and a second input dataset wherein the first input dataset and the second input dataset differ in one element.

14. The method of data obfuscation of claim 1, wherein the distortion operation comprises adding stochasticity to elements of the input dataset and wherein the parameters of the distortion operation are parameters of a stochastic noise distribution.

15. The method of data obfuscation of claim 1, wherein the distortion operation comprises steps for obfuscating individual features of the input dataset.

16. The method of data obfuscation of claim 15, wherein the distortion operation obfuscates individual features of the input dataset based on independent and identically distributed random variables selected for the individual features based on the parameters of the distortion operation.

17. The method of data obfuscation of claim 1, wherein determining the measure of privacy for obfuscated input data comprises determining a measure of mutual information between the obfuscated input data and input data, and wherein maximizing the measure of privacy comprises minimizing the measure of mutual information based the parameters of the distortion operation.

18. The method of data obfuscation of claim 1, wherein determining a measure of performance degradation comprises determining a loss function for the neural network based on output of the neural network.

19. The method of data obfuscation of claim 1, wherein determining a measure of performance degradation comprises:
determining a loss function for the neural network based on output of the neural network; and
multiplying the loss function by a tunable degradation parameter.

20. The method of data obfuscation of claim 1, comprises steps for tuning a privacy budget.

21. The method of claim 1, comprising steps for obfuscating data.

22. A non-transitory computer-readable medium storing instructions that, when executed by a computer, cause the computer to perform a method of data obfuscation, comprising:
determining, with a computer system, for a neural network, parameters of a distortion operation, wherein the parameters of the distortion operation are determined based on an objective function, wherein:
the distortion operation operates on an input dataset of the neural network to produce an obfuscated input dataset, and
the parameters of the distortion operation are determined by:
determining a measure of privacy for obfuscated input data based on the neural network;
determining a measure of performance degradation for the neural network based on the obfuscated input data; and
adjusting the parameters according to the objective function to modulate the measure of privacy in a first direction that indicates an increase in privacy and modulate the measure of performance degradation in a second direction that indicates a decrease in performance degradation.

* * * * *